United States Patent
Jacobs et al.

(10) Patent No.: US 10,581,085 B2
(45) Date of Patent: Mar. 3, 2020

(54) PEROVSKITE COMPOUNDS FOR STABLE, HIGH ACTIVITY SOLID OXIDE FUEL CELL CATHODES AND OTHER APPLICATIONS

(71) Applicant: Wisconsin Alumni Research Foundation, Madison, WI (US)

(72) Inventors: Ryan Matthew Jacobs, Madison, WI (US); Dane Morgan, Middleton, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 305 days.

(21) Appl. No.: 15/384,482

(22) Filed: Dec. 20, 2016

(65) Prior Publication Data

US 2018/0175396 A1    Jun. 21, 2018

(51) Int. Cl.
- *H01M 4/90* (2006.01)
- *H01M 8/124* (2016.01)
- *H01M 4/86* (2006.01)

(52) U.S. Cl.
CPC .. *H01M 4/9033* (2013.01); *H01M 2004/8689* (2013.01); *H01M 2008/1293* (2013.01)

(58) Field of Classification Search
CPC .................................................. H01M 4/9033
See application file for complete search history.

(56) References Cited

U.S. PATENT DOCUMENTS

| | | | |
|---|---|---|---|
| 2004/0072060 A1* | 4/2004 | Ukai | H01M 8/1213 |
| | | | 429/465 |
| 2014/0017598 A1* | 1/2014 | Nakai | H01M 8/026 |
| | | | 429/482 |
| 2016/0301070 A1 | 10/2016 | Tong et al. | |

OTHER PUBLICATIONS

Rim, Hyung-Ryul, et al. "Characteristics of Pr1-xMxMnO3 (M=Ca, Sr) as Cathode Material in Solid Oxide Fuel Cells." Materials Chemistry and Physics, vol. 52, No. 1, 1998, pp. 54-59. (Year: 1998).*
Ryan Jacobs, High-throughput computational screening of perovskites for stable, high activity SOFC cathodes, 2016 MRS Spring Meeting, MD1.12 Materials Design Using Theory and Computation, Phoenix, AZ, Mar. 31, 2016.
Dane Morgan, Collaborative Networks and the MGI, DOE/NSF Materials Genome Initiative (MGI) Principal Investigators' Meeting, North Bethesda, MD, Jan. 12, 2015.
Zhang et al., Materials synthesis, electrochemical characterization and oxygen permeation properties of Fe-doped BaZrO3, Solid State Ionics 266, Sep. 16, 2014, pp. 58-67.
Lee et al., Prediction of solid oxide fuel cell cathode activity with first-principles descriptors, Energy Environ. Sci. 4, Aug. 24, 2011, pp. 3966-3970.

(Continued)

*Primary Examiner* — Stephan J Essex
(74) *Attorney, Agent, or Firm* — Bell & Manning, LLC; N. Meredith Porembski

(57) ABSTRACT

Solid oxide fuel cells (SOFCs) are provided. A SOFC may comprise a cathode, an anode, and a solid oxide electrolyte between the anode and the cathode, wherein the cathode comprises a perovskite compound. The perovskite compound may be characterized by a log k* value which is less negative than about −6.0 cm/s; an energy above the convex hull of less than about 40 meV/(formula unit); a bandgap of about 0 and a charge transfer gap of about 0.

17 Claims, 10 Drawing Sheets

(56) References Cited

OTHER PUBLICATIONS

Kim et al., Defect Chemistry and Electrochemical Properties of BaZrO3 Heavily Doped with Fe, ECS Transactions, 45 (1), 2012, pp. 161-170.
Dong et al., $BaNb_{0.05}Fe_{0.95}O_3$-$\delta$ as a new oxygen reduction electrocatalyst for intermediate temperature solid oxide fuel cells, J. Mater. Chem. A 1, Jun. 4, 2013, pp. 9781-9791.

* cited by examiner

PEROVSKITE COMPOUNDS FOR STABLE, HIGH ACTIVITY SOLID OXIDE FUEL CELL CATHODES AND OTHER APPLICATIONS

REFERENCE TO GOVERNMENT RIGHTS

This invention was made with government support under FA-9550-11-1-0299 awarded by the US Air Force/AFOSR and OCI1148011 awarded by the National Science Foundation. The government has certain rights in the invention.

BACKGROUND

The increasing demand to reduce the dependency on fossil fuels has necessitated advancements in device-related materials for alternative energy technologies. Solid oxide fuel cells (SOFCs) may play an important role in the future of energy technology, as they are able to produce energy by direct chemical-to-electrical conversion of oxygen and hydrogen or hydrocarbon fuels with high efficiency and relatively little emission of greenhouse gases.[1,2] When operated in reverse, the fuel cell functions as an electrolyzer, effectively storing the energy obtained by splitting water into hydrogen and oxygen for future power generation.[3]

Typically, SOFCs must be operated at high temperatures of around 800-1000° C. in order to overcome the slow kinetics of the oxygen reduction reaction (ORR) ($O_2 + 4e^- \rightarrow 2O^{2-}$) at the cathode, which is the result of the high overpotential associated with the ORR.[4,5] The slow kinetics of the ORR is a major contributor to the overall resistance of the SOFC, resulting in decreased device efficiency.[4] High temperature operation of the SOFC causes accelerated materials degradation and high operational costs. Improving the cathode performance and hence the device efficiency of SOFCs is critically important for the future viability of these technologies for the alternative energy markets. Although some perovskite compounds have been found which exhibit high ORR[6] and oxygen evolution reaction (OER)[7] activities, perovskite compounds exhibiting both high catalytic activity and high stability under operating conditions remain elusive.[6-13]

SUMMARY

The present disclosure provides perovskite compounds, electrodes which include the perovskite compounds and devices which include the electrodes. Related methods are also provided.

In one aspect, solid oxide fuel cells (SOFCs) are provided. In one embodiment, a SOFC comprises a cathode, an anode, and a solid oxide electrolyte between the anode and the cathode, wherein the cathode comprises a perovskite compound. The perovskite compound is selected from $PrCoO_3^-$; $Ba_{(1-a-b)}La_aZn_bNiO_3$ (Formula 1B), wherein $0.125 \leq a \leq 0.25$ and $0.25 \leq b \leq 0.375$; $A_{(1-x)}A'_xB_yB'_{y'}B''_{y''}O_3$ (Formula 1C), wherein $0 \leq x \leq 0.5$, $0.125 \leq y \leq 1$, $0 \leq y' \leq 0.875$, $0 \leq y'' \leq 0.875$, $y+y'+y''=1$, and if x is zero, then y is not 1; wherein A is selected from Ba, Y, and Pr; A' is selected from Ca, Sr, Ba, Sm, Nd, Cd, and Sn, wherein A and A' are different; B is selected from Cr, Mn, Fe, and Co; B' is selected from Co, Ni, Zr, Nb, Ru, Hf, Ta, Re, Os, and Pt; and B" is Zr, wherein B, B', and B" are different; and combinations thereof. The perovskite compound is characterized by a log k* value which is less negative than about −6.0 cm/s; an energy above the convex hull of less than about 40 meV/(formula unit); a bandgap of about 0 and a charge transfer gap of about 0. The perovskite compound is not $Ba_{0.5}Sr_{0.5}Fe_{0.9}Nb_{0.1}O_3$. In embodiments, the perovskite compound is dispersed throughout a cathode substrate to provide the cathode as an infiltrated cathode, wherein if the cathode substrate comprises another perovskite compound, the perovskite compound is different from the another perovskite compound of the cathode substrate.

In another aspect, an electrode is provided which comprises a perovskite compound selected from $BaFe_{0.75}Nb_{0.25}O_3$; $BaFe_{0.75}Ta_{0.25}O_3$; $BaFe_{0.125}Co_{0.125}Zr_{0.75}O_3$; $BaFe_{0.875}Re_{0.125}O_3$; $Ba_{0.625}La_{0.125}Zn_{0.375}NiO_3$; $Ba_{0.875}Sn_{0.125}Fe_{0.125}Zr_{0.875}O_3$; $BaFe_{0.75}Ru_{0.25}O_3$; $BaFe_{0.5}Pt_{0.5}O_3$; $Ba_{0.75}Sn_{0.25}Fe_{0.125}Hf_{0.125}Zr_{0.75}O_3$; $YFe_{0.875}Ni_{0.125}O_3$; $Ba_{0.875}Cd_{0.125}Fe_{0.125}Hf_{0.125}Zr_{0.75}O_3$; $BaFe_{0.5}Ru_{0.5}O_3$; $Pr_{0.5}Sr_{0.5}MnO_3$; $Pr_{0.5}Nd_{0.5}CoO_3$; $Pr_{0.5}Sm_{0.5}CoO_3$; $Pr_{0.75}Ca_{0.25}CrO_3$; $BaFe_{0.75}Os_{0.25}O_3$; $Pr_{0.75}Ba_{0.25}CrO_3$; $Ba_{0.75}Cd_{0.25}Fe_{0.125}Hf_{0.125}Zr_{0.75}O_3$; $Pr_{0.75}Nd_{0.25}CoO_3$; $Pr_{0.75}Sr_{0.25}CrO_3$; $YFe_{0.875}Co_{0.125}O_3$; $Pr_{0.5}Ca_{0.5}MnO_3$; and combinations thereof.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1A:
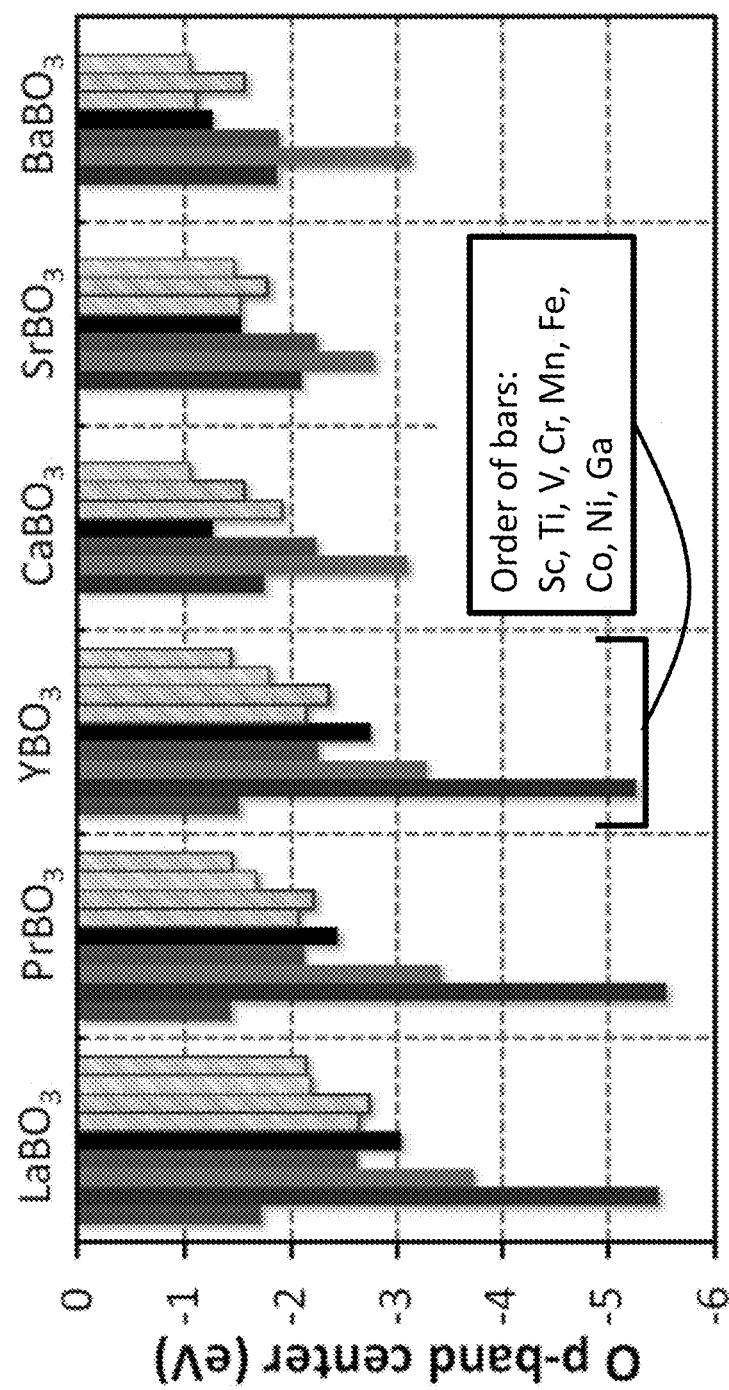
FIGS. 1A-B illustrate the trend of calculated O p-band center as a function of composition for materials with (FIG. 1A) different B-site elements with constant A-site element and (FIG. 1B) different A-site elements with constant B-site element. A high (less negative) value of the O p-band center correlates with a high k* value, which is indicative of high ORR activity. The order of the bars is indicated using $YBO_3/AVO_3$ as examples.

The present disclosure provides perovskite compounds, electrodes which include the perovskite compounds and devices which include the electrodes. Related methods are also provided.

Perovskite compounds have been found which exhibit both high catalytic activity for the oxygen reduction reaction (ORR) as well as high thermodynamic stability under ORR operating conditions. Thus, the perovskite compounds may be used as the cathodes in solid oxide fuel cells (SOFCs), enabling lower temperature operation of the SOFCs, which in turn improves fuel cell lifetime by slowing materials degradation. These cathode improvements increase the economic incentive of large scale commercialization of SOFC technology. Other applications for the perovskite compounds include any involving oxygen exchange reactions such as oxygen gas separation; oxygen sensors; chemical looping; and energy storage.

The present perovskite compounds include those derived from parent $ABO_3$ perovskite compounds in which the A-site element in the parent is alloyed with another A-site element or replaced with another A-site element or an alloy of other A-site elements. In some cases, the B-site element in the parent is also alloyed with one or more other B-site elements or replaced with another B-site element. The particular composition (selection of A-site element(s), B-site element(s), and ratios of elements) are selected to provide perovskite compounds which are highly catalytically active and highly chemically stable for the desired application.

Parent $ABO_3$ perovskite compounds include La(Cr, Mn, Fe, Ni)$O_3$ perovskites. Thus, the present perovskite compounds include those derived from La(Cr, Mn, Fe, Ni)$O_3$ perovskites in which La in the parent is alloyed with another A-site element or replaced with another A-site element or replaced with an alloy of other A-site elements. The other A-site elements which may be used include alkaline earth elements (e.g., Ca, Sr, Ba), rare earth elements (e.g., Y, Pr, Nd, Sm), certain transition metal elements (e.g., Cd, Zn), and certain post-transition metal elements (e.g., Sn). In some embodiments, the B-site element (i.e., either Cr, Mn, Fe, or Ni) is also alloyed with one or more other B-site elements. The other B-site elements which may be used include transition metal elements (e.g., Mn, Fe, Co, Ni, Zr, Nb, Ru, Hf, Ta, Re, Os, Pt). In some embodiments, the B-site element (i.e., either Cr, Mn, Fe or Ni) is replaced with one of the other B-site elements, e.g., Co.

By way of illustration, starting from a parent La(Cr, Mn, Fe, Ni)$O_3$ perovskite, the present perovskite compounds include those in which La in the parent has been replaced with Sr or Y or La in the parent has been replaced with various alloys which include Y, Sn, or Cd. As another illustration, starting from a parent La(Cr, Mn, Fe, Ni)$O_3$ perovskite, the present perovskite compounds include those in which the B-site element (i.e., either Cr, Mn, Fe, or Ni) has also been alloyed with one or more elements having an oxidation state which does not change under the operating conditions in which the perovskite compound is used (e.g., under the operating conditions for driving ORR). Elements having such an unchanged oxidation state may be referred to as "redox-inactive" throughout the present disclosure. Such elements include Zr, Nb, Hf, Ta, Re, and Os.

The present perovskite compounds include those which are highly catalytically active as indicated by the value of the surface exchange coefficient log $k^*$. In particular, the present perovskite compounds include those which are characterized by a surface exchange coefficient log $k^*$ value which is less (less negative) than the experimentally measured log $k^*$ value for the known perovskite $La_{0.625}Sr_{0.375}Co_{0.25}Fe_{0.75}O_3$ (LSCF) (about –6.0 cm/s; see Ref 28). The surface exchange coefficient log $k^*$ value of the present perovskite compounds may be a calculated value (using the methods described in Example 1, below) or a measured value (using the experimental method outlined in Ref. 28).

The present perovskite compounds include those which are highly thermodynamically stable as indicated by the value of their energy above the convex hull under the selected operating conditions. By "convex hull" it is meant the set of all compounds and their mixtures which provide the lowest Gibbs free energy of the system under consideration at a given temperature and pressure, which compounds and their mixtures form the equilibrium phases of a specific set of elements. The convex hull is modeled using an approximation to Gibbs free energies. All materials which have energies on the convex hull (and are thus materials that are stable and on the equilibrium phase diagram) have an energy above the convex hull of zero. Systems with a given energy above the convex hull are unstable with respect to the stable phases of the elements in the system by that energy. The present perovskite compounds include those which exhibit an energy above the convex hull of less than about 40 meV/(formula unit) under operating conditions used to drive the ORR. These operating conditions may be a temperature of 800° C., a partial pressure of oxygen of 0.21 atm and 100% relative humidity. The energy above the convex hull is a calculated value which may be determined using the methods described in Example 1, below. In embodiments, the perovskite compounds exhibit an energy above the convex hull of less than about 35 meV/(formula unit), less than about 30 meV/(formula unit), less than about 25 meV/(formula unit), or less than about 20 meV/(formula unit).

The present perovskite compounds include those which are conductive as indicated by the lack of a bandgap and the lack of a charge transfer gap. In particular, the present perovskite compounds include those which have a bandgap and a charge transfer gap of about zero (i.e., zero but not necessarily exactly zero). The bandgap/charge transfer gap values may be calculated values which may be determined using the methods described in Example 1, below.

The present perovskite compounds include those which exhibit each (i.e., all three) of these properties.

The present perovskite compounds include those having the formula $A_xA'_{x'}A''_{x''}B_yB'_{y'}B''_{y''}O_3$ (Formula 1A), wherein $x+x'+x''=1$; $y+y'+y''=1$. The elements A, A', A", B, B', and B" may be selected as described above. In embodiments, A, A', and A" are independently selected from Ca, Sr, Ba, Y, La, Pr, Sm, Nd, Zn, Cd, and Sn; and B, B', B" are independently selected from Cr, Mn, Fe, Co, Ni, Zr, Nb, Ru, Hf, Ta, Re, Os, and Pt. In embodiments, the perovskite compound has the formula $A_{(1-x-y)}A'A''_yBO_3$ (Formula 1B), wherein $0.125 \leq x \leq 0.25$ and $0.25 \leq y \leq 0.375$. The elements A, A', A", and B may be selected as described above. In embodiments, A is Ba, A' is La, A" is Zn and B is Ni.

The present perovskite compounds include those having the formula $A_{(1-x)}A'_xB_yB'_{y'}B''_{y''}O_3$ (Formula 1C), wherein $0 \leq x \leq 1$; $y+y'+y''=1$; and if x is zero, then y is not 1. The elements A, A', B, B', and B" may be selected as described above. In embodiments, A and A' are independently selected from Ca, Sr, Ba, Y, La, Pr, Sm, Nd, Cd, and Sn; and B, B', B" are independently selected from Cr, Mn, Fe, Co, Ni, Zr, Nb, Ru, Hf, Ta, Re, Os, and Pt. In embodiments, A is selected from Sr, Ba, Y, La, and Pr and A' is selected from Ca, Sr, Ba, Pr, Sm, Nd, Cd, and Sn (where A and A' are different); B is selected from Cr, Mn, Fe, Co, and Ni; B' is selected from Mn, Fe, Co, Ni, Zr, Nb, Ru, Hf, Ta, Re, Os, and Pt; and B" is Zr (where B, B', and B" are different); and $0 \leq x \leq 0.5$; $0.125 \leq y \leq 1$; $0 \leq y' \leq 0.875$; and $0 \leq y'' \leq 0.875$. In some such embodiments, A is Y. In other such embodiments A' is Cd or Sn. In other such embodiments, B' is selected from Ru, Hf, Ta, Re, and Os.

In some embodiments in which the perovskite compound has Formula 1C, A is selected from Ba, Y, and Pr and A' is selected from Ca, Sr, Ba, Sm, Nd, Cd, and Sn (where A and A' are different); B is selected from Cr, Mn, Fe, and Co; B' is selected from Co, Ni, Zr, Nb, Ru, Hf, Ta, Re, Os, and Pt; and B" is Zr (where B, B', and B" are different); and $0 \leq x \leq 0.5$; $0.125 \leq y \leq 1$; $0 \leq y' \leq 0.875$; $0 \leq y'' \leq 0.875$; and $y+y'+y''=1$. In some such embodiments, A is Y. In other such embodiments A' is Cd or Sn. In other such embodiments, B' is selected from Ru, Hf, Ta, Re, and Os.

In some embodiments, the perovskite compound is $PrCoO_3$.

The present perovskite compounds include those having the formula $A_{(1-x)}A'_xB_{(1-y)}B'_yO_3$ (Formula 2A), wherein $0 \leq x \leq 0.5$; $0 \leq y \leq 0.875$; and x and y are not both zero. The elements A, A', B, and B' may be selected as described above. In embodiments, A and A' are independently selected from Ca, Sr, Ba, Y, La, Pr, Sm, Nd, Cd, and Sn; and B and B' are independently selected from Cr, Mn, Fe, Co, Ni, Zr, Nb, Ru, Hf, Ta, Re, Os, and Pt. In embodiments, A is Y; A' is selected from Ca, Sr, Ba, La, Pr, Cd, and Sn; and B and B' are independently selected from Cr, Mn, Fe, Co, Ni, Zr, Nb, Ru, Hf, Ta, Re and Os. In embodiments, A is selected from Ca, Sr, Ba, Y, La, Pr, and Cd; A' is Sn; and B and B' are independently selected from Cr, Mn, Fe, Co, Ni, Zr, Nb, Ru, Hf, Ta, Re and Os. In embodiments, A and A' are independently selected from Ca, Sr, Ba, Y, La, Pr, Cd, and Sn; and B is selected from Cr, Mn, Fe, and Ni; and B' is selected from Ru, Hf, Ta, Re, and Os. In embodiments, A is selected from Sr, Ba, Y, La, and Pr; A' is selected from Ca, Sr, Ba, Pr, Sm, Nd, Cd, and Sn (where A and A' are different); B is selected from Cr, Mn, Fe, Co, and Ni; and B' is selected from Mn, Fe, Co, Ni, Zr, Nb, Ru, Hf, Ta, Re, Os, and Pt (where B and B' are different). In some such embodiments, A is Y. In other such embodiments A' is Sn. In other such embodiments, B' is selected from Ru, Hf, Ta, Re, and Os.

In some embodiments in which the perovskite compound has Formula 2A, A and A' are independently selected from Ca, Sr, Ba, Y, Pr, Sm, Nd, and Sn; and B and B' are independently selected from Cr, Mn, Fe, Co, Ni, Zr, Nb, Ru, Ta, Re, and Pt. In embodiments, A is selected from Ba, Y, and Pr; A' is selected from Ca, Sr, Ba, Sm, Nd, and Sn (where A and A' are different); B is selected from Cr, Mn, Fe, and Co; and B' is selected from Ni, Zr, Nb, Ru, Ta, Re, Os, and Pt. In some such embodiments, A is Y. In other such embodiments A' is Sn. In other such embodiments, B' is selected from Ru, Ta, Re, and Os.

The present perovskite compounds include those having the formula $A_{(1-x)}A'_xBO_3$ (Formula 2B), wherein $0.25 \leq x \leq 0.5$. The elements A, A', and B may be selected as described above. In embodiments, A and A' are independently selected from Ca, Sr, Ba, Y, La, Pr, Sm, and Nd; and B is selected from Cr, Mn, Fe, and Co. In embodiments, A is Y; A' is selected from Ca, Sr, Ba, La, and Pr; and B is selected from Cr, Mn, and Fe. In embodiments, A is selected from Y, La and Pr; A' is selected from Ca, Sr, Ba, Sm, and Nd; and B is selected from Cr, Mn, Fe, and Co. In embodiments, A is Y; A' is selected from Ca, Sr, and Ba; and B is selected from Cr, Mn, and Fe.

In some embodiments in which the perovskite compound has Formula 2B, A and A' are independently selected from Ca, Sr, Ba, Pr, Sm, and Nd; and B is selected from Cr, Mn, and Co. In embodiments, A is Pr; A' is selected from Ca, Sr, Ba, Sm and Nd; and B is selected from Cr, Mn, and Co.

The present perovskite compounds include those having the formula $AB_yB'_{y'}B''_{y''}O_3$ (Formula 3A), wherein $0.125 \leq y \leq 0.875$; $0.125 \leq y' \leq 0.875$; $0 \leq y'' \leq 0.875$; and $y+y'+y''=1$. The elements A, B, B', and B" may be selected as described above. In embodiments, A is selected from Sr, Ba, Y, and Pr; and B, B', B" are independently selected from Mn, Fe, Co, Ni, Zr, Nb, Ru, Hf, Ta, Re, Os, and Pt. In embodiments, A is Sr, Ba, or Y; and B, B', B" are independently selected from Mn, Fe, Co, Ni, Zr, Nb, Ru, Hf, Ta, Re, Os, and Pt. In embodiments, A is selected from Sr, Ba, Y, and Pr; B is selected from Mn, Fe, and Ni; B' is selected from Ru, Hf, Ta, Re, and Os; and B" is Zr. In embodiments, A is selected from Sr, Ba, Y, and Pr; B is selected from Mn, Fe, and Ni; B' is selected from Fe, Co, Ni, Nb, Ru, Hf, Ta, Re, Os, and Pt; and B" is Zr (where B, B', and B" are different). In some such embodiments, A is Sr or Y. In some such embodiments, B' is selected from Ru, Hf, Ta, Re, and Os.

In some embodiments in which the perovskite compound has Formula 3A, A is selected from Ba and Y; and B, B', B" are independently selected from Fe, Co, Ni, Zr, Nb, Ru, Ta, Re, Os, and Pt. In embodiments, A is selected from Ba and Y; B is Fe; B' is selected from Co, Ni, Nb, Ru, Ta, Re, Os, and Pt; and B" is Zr. In embodiments, A is Ba; B is Fe; B' is selected from Co, Nb, Ru, Ta, Re, Os, and Pt; and B" is Zr. In some such embodiments, B' is selected from Ru, Ta, Re, and Os.

The present perovskite compounds include those having the formula $AB_{(1-y)}B'_yO_3$ (Formula 3B), wherein $0.125 \leq y \leq 0.875$. The elements A, B, and B' may be selected as described above. In embodiments, A is selected from Sr, Ba, Y, and Pr; and B and B' are independently selected from Mn, Fe, Co, Ni, Nb, Ru, Hf, Ta, Re, Os and Pt. In embodiments, A is Sr, Ba or Y; and B and B' are independently selected from Mn, Fe, Co, Ni, Nb, Ru, Hf, Ta, Re Os, and Pt. In embodiments, A is selected from Sr, Ba, Y, and Pr; B is selected from Mn, Fe, and Ni; and B' is selected from Ru, Hf, Ta, Re, and Os. In embodiments, A is selected from Sr, Ba, Y, and Pr; B is selected from Mn, Fe, and Ni; and B' is selected from Fe, Co, Ni, Nb, Ru, Hf, Ta, Re, Os, and Pt (where B and B' are different). In some such embodiments, A is Sr or Y. In some such embodiments, B' is selected from Ru, Hf, Ta, Re, and Os.

In some embodiments in which the perovskite compound has Formula 3B, A is selected from Ba and Y; and B and B' are independently selected from Fe, Ni, Nb, Ru, Ta, Re, Os and Pt. In embodiments, A is selected from Ba and Y; B is Fe; and B' is selected from Ni, Nb, Ru, Ta, Re, Os, and Pt. In embodiments, A is Ba; B is Fe; and B' is selected from Nb, Ru, Ta, Re, Os, and Pt. In some such embodiments, B' is selected from Ru, Ta, Re, and Os.

The present perovskite compounds include those having the formula $A_{(1-x)}A'_xB_yB'_{y'}B''_{y''}O_3$ (Formula 4A), wherein $0 \leq x \leq 0.5$; $0.125 \leq y \leq 0.875$; $0.125 \leq y' \leq 0.875$; and $0 \leq y'' \leq 0.75$; and $y+y'+y''=1$. The elements A, A', B, B', and B'' may be selected as described above. In embodiments, B' or B'' or both is selected from an element having an oxidation state which does not change under the operating conditions in which the perovskite compound is used (e.g., under the operating conditions for driving ORR). In embodiments, A and A' are independently selected from Ba, Cd, and Sn; and B, B', B'' are independently selected from Fe, Co, Ni, Zr, Nb, Hf, Ta, and Re. In embodiments, A is Ba; A' is selected from Cd, and Sn; and B, B', B'' are independently selected from Fe, Co, Ni, Zr, Nb, Hf, Ta, and Re. In embodiments, A and A' are independently selected from Ba, Cd, and Sn; B is selected from Fe and Ni; B' is selected from Re, Hf, and Ta; and B'' is Zr. In embodiments, A is Ba; A' is selected from Cd, and Sn; B is selected from Fe and Ni; B' is selected from Co, Zr, Nb, Hf, Ta, and Re; and B'' is Zr (where B, B', and B'' are different). In embodiments, A is Ba; A' is selected from Cd and Sn; B is selected from Fe and Ni; B' is selected from Hf, Ta, and Re; and B'' is Zr.

In some embodiments in which the perovskite compound has Formula 4A, A and A' are independently selected from Ba, Cd, and Sn; and B, B', B'' are independently selected from Fe, Co, Zr, Nb, Hf, Ta, and Re. In embodiments, A is Ba; A' is selected from Cd, and Sn; and B, B', B'' are independently selected from Fe, Co, Zr, Nb, Hf, Ta, and Re. In embodiments, A and A' are independently selected from Ba, Cd, and Sn; B is Fe; B' is selected from Re, Hf, and Ta; and B'' is Zr. In embodiments, A is Ba; A' is selected from Cd, and Sn; B is Fe; B' is selected from Co, Zr, Nb, Hf, Ta, and Re; and B'' is Zr (where B, B', and B'' are different). In embodiments, A is Ba; A' is selected from Cd and Sn; B is Fe; B' is selected from Hf, Ta, and Re; and B'' is Zr.

The present perovskite compounds include those having the formula $A_{(1-x)}A'_xB_yB'_{y'}B''_{y''}O_3$ (Formula 4B), wherein $0.125 \leq x \leq 0.5$; $y=y'=0.125$; and $y''=0.75$. The elements A, A', B, B', and B'' may be selected as described above. In embodiments, A and A' are independently selected from Ba, Cd, and Sn; B is Fe; B' is Hf; and B'' is Zr. In embodiments, A is Ba; A' is selected from Cd and Sn; B is Fe; B' is Hf; and B'' is Zr.

In some embodiments in which the perovskite compound has Formula 4B, A and A' are independently selected from Ba, Cd, and Sn; B is Fe; B' is Hf; and B'' is Zr and $0.125 \leq x \leq 0.25$. In some such embodiments, A is Ba; A' is selected from Cd and Sn; B is Fe; B' is Hf; and B'' is Zr.

The present perovskite compounds include those having the formula $A_{(1-x)}A'_xB_yB'_{y'}B''_{y''}O_3$ (Formula 5), wherein $0 \leq x \leq 0.5$; $0.125 \leq y \leq 0.875$; $0.125 \leq y' \leq 0.875$; $0 \leq y'' \leq 0.75$; and $y+y'+y''=1$. The elements A, A', B, B', and B'' may be selected as described above. In embodiments, A and A' are independently selected from Sr, Ba, Y, Pr, and Sn; and B, B', B'' are independently selected from Mn, Fe, Co, Ni, Zr, Nb, Ru, Hf, Ta, Re, and Pt. In embodiments, A is Sr or Y; A' is Ba, Pr, or Sn; and B, B', B'' are independently selected from Mn, Fe, Co, Ni, Zr, Nb, Hf, Ta, and Re. In embodiments, A and A' are independently selected from Sr, Ba, Y, Pr, and Sn; B is selected from Mn, Fe, and Ni; B' is selected from Hf, Ta, and Re; and B'' is Zr. In embodiments, A is selected from Sr, Ba, Y, and Pr; A' is selected from Sr, Ba and Sn (where A and A' are different); B is selected from Mn, Fe, and Ni; B' is selected from Fe, Co, Ni, Zr, Nb, Ru, Hf, Ta, Re and Pt; and B'' is Zr (where B, B', and B'' are different). In embodiments, A is Sr or Y; A' is Ba or Sn; B is selected from Mn, Fe, and Ni; B' is selected from Fe, Co, Ni, Zr, Nb, Hf, Ta, and Re; and B'' is Zr (where B, B', and B'' are different). In embodiments, A is selected from Sr, Ba, Y, and Pr; A' is selected from Sr, Ba and Sn (where A and A' are different); B is selected from Mn, Fe, and Ni; B' is selected from Hf, Ta, and Re; and B'' is Zr (where B, B', and B'' are different).

In some embodiments in which the perovskite compound has Formula 5, x ranges from 0 to 0.25. In some such embodiments, A and A' are independently selected from Ba and Sn; and B, B', B'' are independently selected from Fe, Co, Zr, Nb, Ru, Hf, Ta, Re, and Pt. In some such embodiments, A is Ba; A' is Sn; B is Fe; B' is selected from Co, Zr, Nb, Ru, Hf, Ta, Re, and Pt; and B'' is Zr. In some such embodiments, A is Ba; A' is Sn; B is Fe; B' is selected from Hf, Ta, and Re; and B'' is Zr.

Tables 1 and 2, below, list illustrative perovskite compounds according to the present disclosure, along with their calculated O p-band center, calculated log k* values and calculated energies above the convex hull.

TABLE 1

Illustrative perovskite compounds with the calculated stability under ORR conditions, O p-band center and values of k* based on O p-band calculations. Materials are listed in descending order by their k* values. As a point of comparison, the experimental values of log k* for LSCF and BSCF are approximately −6.0 cm/s and −3.8 cm/s, respectively.

| Perovskite | Calculated O p-band center (eV) | Predicted log k* (cm/s) | Calculated energy above convex hull (meV/formula unit) |
|---|---|---|---|
| $BaNi_{0.125}Hf_{0.875}O_3$ | −1.231 | −2.522 | 51.9 |
| $BaFe_{0.75}Nb_{0.25}O_3$ | −1.253 | −2.599 | 36.3 |
| $BaFe_{0.75}Ta_{0.25}O_3$ | −1.282 | −2.697 | 27.3 |
| $BaFe_{0.125}Co_{0.125}Zr_{0.75}O_3$ | −1.355 | −2.947 | 19.5 |
| $BaFe_{0.875}Re_{0.125}O_3$ | −1.378 | −3.027 | 30.4 |
| $BaFe_{0.125}Co_{0.25}Zr_{0.625}O_3$ | −1.428 | −3.199 | 56.5 |
| $SrMn_{0.75}Fe_{0.25}O_3$ | −1.481 | −3.380 | 81.6 |
| $Ba_{0.875}Sn_{0.125}Fe_{0.125}Zr_{0.875}O_3$ | −1.509 | −3.477 | 21.2 |
| $Y_{0.5}Sr_{0.5}FeO_3$ | −1.662 | −3.999 | 70.8 |
| $Pr_{0.5}Ba_{0.5}MnO_3$ | −1.671 | −4.028 | 87.0 |
| $Pr_{0.5}Sr_{0.5}FeO_3$ | −1.679 | −4.057 | 58.6 |
| $Pr_{0.5}Ca_{0.5}FeO_3$ | −1.767 | −4.360 | 55.5 |

TABLE 1-continued

Illustrative perovskite compounds with the calculated stability
under ORR conditions, O p-band center and values of k* based
on O p-band calculations. Materials are listed in descending
order by their k* values. As a point of comparison, the experimental
values of log k* for LSCF and BSCF are approximately −6.0
cm/s and −3.8 cm/s, respectively.

| Perovskite | Calculated O p-band center (eV) | Predicted log k* (cm/s) | Calculated energy above convex hull (meV/formula unit) |
|---|---|---|---|
| $Ba_{0.5}Sn_{0.5}Fe_{0.125}Hf_{0.125}Zr_{0.75}O_3$ | −1.791 | −4.442 | 85.2 |
| $Ba_{0.5}Pr_{0.5}Fe_{0.25}Mn_{0.75}O_3$ | −1.818 | −4.532 | 80.5 |
| $YFe_{0.875}Ni_{0.125}O_3$ | −1.870 | −4.711 | 37.5 |
| $Ba_{0.875}Cd_{0.125}Fe_{0.125}Hf_{0.125}Zr_{0.75}O_3$ | −1.938 | −4.945 | 0.0 |
| $BaFe_{0.5}Ru_{0.5}O_3$ | −1.967 | −5.046 | 0.0 |
| $Pr_{0.5}Sr_{0.5}Mn_{0.75}Fe_{0.25}O_3$ | −1.972 | −5.061 | 56.9 |
| $Pr_{0.5}Sr_{0.5}MnO_3$ | −1.979 | −5.085 | 34.0 |
| $La_{0.5}Ba_{0.5}Mn_{0.75}Fe_{0.25}O_3$ | −2.045 | −5.311 | 83.1 |
| $La_{0.5}Ba_{0.5}Mn_{0.875}Fe_{0.125}O_3$ | −2.050 | −5.329 | 87.1 |
| $Pr_{0.75}Ca_{0.25}CrO_3$ | −2.057 | −5.351 | 13.9 |
| $BaFe_{0.75}Os_{0.25}O_3$ | −2.067 | −5.386 | 29.5 |
| $PrFe_{0.75}Co_{0.25}O_3$ | −2.070 | −5.397 | 47.9 |
| $Y_{0.5}Sr_{0.5}MnO_3$ | −2.078 | −5.424 | 52.6 |
| $La_{0.5}Ba_{0.5}MnO_3$ | −2.136 | −5.622 | 78.1 |
| $Pr_{0.75}Ba_{0.25}CrO_3$ | −2.152 | −5.678 | 33.7 |
| $Ba_{0.75}Cd_{0.25}Fe_{0.125}Hf_{0.125}Zr_{0.75}O_3$ | −2.162 | −5.711 | 0.0 |
| $Pr_{0.75}Sr_{0.25}CrO_3$ | −2.213 | −5.887 | 12.2 |
| $YFe_{0.875}Co_{0.125}O_3$ | −2.238 | −5.970 | 27.1 |
| $Pr_{0.5}Ca_{0.5}MnO_3$ | −2.241 | −5.982 | 37.0 |

TABLE 2

Illustrative perovskite compounds with the calculated stability
under ORR conditions, O p-band center and values of k* based
on O p-band calculations. Materials are listed in descending
order by their k* values. As a point of comparison, the experimental
values of log k* for LSCF and BSCF are approximately −6.0
cm/s and −3.8 cm/s, respectively. Each of these compounds
meets the criteria of having an energy above the convex hull
of less than about 40 meV/(formula unit).

| Material Composition | Calculated O p-band center (eV) | Predicted log k* (cm/s) | Calculated energy above convex hull (meV/formula unit) |
|---|---|---|---|
| $BaFe_{0.75}Nb_{0.25}O_3$ | −1.253 | −2.599 | 36.3 |
| $BaFe_{0.75}Ta_{0.25}O_3$ | −1.282 | −2.697 | 27.3 |
| $BaFe_{0.125}Co_{0.125}Zr_{0.75}O_3$ | −1.355 | −2.947 | 19.5 |
| $BaFe_{0.875}Re_{0.125}O_3$ | −1.378 | −3.027 | 30.4 |
| $Ba_{0.625}La_{0.125}Zn_{0.375}NiO_3$ | −1.479 | −3.372 | 0.0 |
| $Ba_{0.875}Sn_{0.125}Fe_{0.125}Zr_{0.875}O_3$ | −1.509 | −3.477 | 21.2 |
| $BaFe_{0.75}Ru_{0.25}O_3$ | −1.640 | −3.924 | 12.9 |
| $BaFe_{0.5}Pt_{0.5}O_3$ | −1.799 | −4.468 | 9.8 |
| $Ba_{0.75}Sn_{0.25}Fe_{0.125}Hf_{0.125}Zr_{0.75}O_3$ | −1.841 | −4.612 | 3.5 |
| $YFe_{0.875}Ni_{0.125}O_3$ | −1.870 | −4.711 | 37.5 |
| $Ba_{0.875}Cd_{0.125}Fe_{0.125}Hf_{0.125}Zr_{0.75}O_3$ | −1.938 | −4.945 | 0.0 |
| $BaFe_{0.5}Ru_{0.5}O_3$ | −1.967 | −5.046 | 0.0 |
| $Pr_{0.5}Sr_{0.5}MnO_3$ | −1.979 | −5.085 | 34.0 |
| $Pr_{0.5}Nd_{0.5}CoO_3$ | −2.027 | −5.249 | 25.3 |
| $Pr_{0.5}Sm_{0.5}CoO_3$ | −2.042 | −5.301 | 35.1 |
| $Pr_{0.75}Ca_{0.25}CoO_3$ | −2.057 | −5.351 | 13.9 |
| $BaFe_{0.75}Os_{0.25}O_3$ | −2.067 | −5.386 | 29.5 |
| $Pr_{0.75}Ba_{0.25}CrO_3$ | −2.152 | −5.678 | 33.7 |
| $Ba_{0.75}Cd_{0.25}Fe_{0.125}Hf_{0.125}Zr_{0.75}O_3$ | −2.162 | −5.711 | 0.0 |
| $Pr_{0.75}Nd_{0.25}CoO_3$ | −2.164 | −5.719 | 25.0 |
| $Pr_{0.75}Sr_{0.25}CrO_3$ | −2.213 | −5.887 | 12.2 |
| $YFe_{0.875}Co_{0.125}O_3$ | −2.238 | −5.970 | 27.1 |
| $Pr_{0.5}Ca_{0.5}MnO_3$ | −2.241 | −5.982 | 37.0 |

In Formulas 1A-C, 2A-B, 3A-B, 4A-B, 5 and the formulas of Tables 1 and 2, above, and for all of the perovskite compounds according to the present disclosure, the stoichiometric coefficients for A, A', A", B, B', and B" can vary from the values above. Each stoichiometric coefficient may vary independently, but the variation of a particular stoichiometric coefficient is not more than ±20%. In embodiments, the variation is not more than ±10%, not more than ±5%, or not more than ±1%. By way of illustration, the formula $BaNi_{0.125}Hf_{0.875}O_3$ encompasses the perovskite compounds represented by $Ba_{1\pm20\%}Ni_{0.125\pm20\%}Hf_{0.875\pm20\%}O_{3\pm20\%}$. The allowable variation of stoichiometric coefficients also means that Formulas 1A-C, 2A-B, 3A-B, 4A-B, and 5 and the formulas of Tables 1 and 2, above, encompass perovskite compounds having vacancies on the A-site, vacancies on the B-site, oxygen vacancies, or combinations thereof, although such variation is not more than ±20% as described above. In embodiments, such variation is not more than ±10%, not more than ±5%, or not more than ±1%.

In embodiments, the present perovskite compounds do not include the following compounds: $ABO_3$ compounds; $La_{0.75}Sr_{0.25}CoO_3$; $La_{0.6}Sr_{0.4}CoO_3$; $La_{0.5}Sr_{0.5}CoO_3$; $La_{0.8}Sr_{0.2}CoO_3$; $La_{0.75}Sr_{0.25}MnO_3$; $La_{0.8}Sr_{0.2}MnO_3$; $La_{0.5}Sr_{0.5}FeO_3$; $La_{0.25}Sr_{0.75}Cr_{0.25}Fe_{0.75}O_3$; $La_{0.125}Ba_{0.875}FeO_{2.625}$; $La_{0.0625}Ba_{0.9375}FeO_3$; $La_{0.2}Ba_{0.8}Co_{0.2}Fe_{0.8}O_3$; $La_{0.6}Sr_{0.4}Fe_{0.8}Cu_{0.2}O_3$; $Gd_{0.5}Ba_{0.5}CoO_3$; $Pr_{0.5}Ba_{0.5}CoO_3$; $Pr_{0.8}Sr_{0.2}FeO_3$; $Sm_{0.5}Sr_{0.5}CoO_3$; $BaNb_{0.05}Fe_{0.95}O_3$; $BaNb_{0.0625}Fe_{0.9375}O_3$; $BaFe_{0.125}Zr_{0.875}O_3$; $Ba_{0.9}Fe_{0.10}Zr_{0.90}O_3$; $Ba_{0.95}La_{0.05}FeO_3$; $Ba_{0.5}Sr_{0.5}Zn_{0.2}Fe_{0.8}O_3$; $Ba_{0.5}Sr_{0.5}Fe_{0.9}Nb_{0.1}O_3$; $Ba_{0.5}Sr_{0.5}Co_{0.8}Fe_{0.2}O_3$; $BaCo_{0.4}Fe_{0.4}Zr_{0.2}O_3$; $BaZr_{1-x}Fe_xO_3$, $0.1 \leq x \leq 0.35$; $BaFe_{0.25}Co_{0.625}Nb_{0.125}O_3$; $SrSc_{0.2}Co_{0.8}O_3$; $SrNb_{0.1}Fe_{0.9}O_3$; $SrCo_{0.8}Fe_{0.2}O_3$; and $Bi_{0.5}Sr_{0.5}FeO_3$.

In any of the embodiments based on Formulas 1A-C, 2A-B, 3A-B, 4A-B, 5, one or more of the following provisos may apply: (1) when A or A' is La, the other is not Sr; (2) when A or A' is La and the other is Ba, then B is not Fe or B' is not Co or both; (3) when A is Ba and B is Fe and x=0 and y"=0, then B' is not Zr; (4) when A or A' is Ba, the other is not Sr; (5) when A is Sr and B is Fe and x=0 and y"=0, then B' is not Nb or Co; (6) the perovskite compound is not $Pr_{0.8}Sr_{0.2}FeO_3$; (7) the perovskite compound is not $BaNb_{0.05}Fe_{0.95}O_3$; (8) the perovskite compound is not $BaFe_{0.9375}Nb_{0.0625}O_3$; (9) the perovskite compound is not $BaCo_{0.4}Fe_{0.4}Zr_{0.2}O_3$; and (10) the perovskite compound is not $BaFe_{0.25}Co_{0.625}Nb_{0.125}O_3$.

By way of illustration, in some embodiments based on Formulas 1A-C, each of provisos (1)-(10) apply. In some embodiments based on Formula 2A, provisos (1)-(8) apply. In some embodiments based on Formula 2B, proviso (1) applies. In some embodiments based on Formula 3A, provisos (5), (7)-(9) apply. In some embodiments based on Formula 3B, proviso (5) applies. In some embodiments based on Formula 4A, provisos (3) and (9) apply. In some embodiments based on Formula 5, provisos (3)-(5) and (9) apply.

A variety of methods may be used to form the present perovskite compounds, including simple mixing and sintering of the appropriate precursor compounds (e.g., salts or binary oxides containing the A-site and B-site elements); sol-gel deposition; sputtering; thin film growth techniques such as molecular beam epitaxy, pulsed laser deposition, etc. High temperature heat treatment and multiple iterations of grinding/sintering of synthesized powders may be used to isolate the perovskite phase of the compound formed. Thus, in embodiments, the perovskite compounds are characterized as solid materials which are substantially single phase. By "substantially single phase" it is meant that the solid material is distinguished from a solid material having two or more distinct phases (e.g., via X-ray powder diffraction (XRD) results). Nevertheless, very minor amounts of an additional phase(s) may be present in the perovskite compounds and the perovskite compound may still be considered to be primarily a single phase.

The present perovskite compounds may be used to form electrodes for use in a variety of electrochemical devices. The electrode may be formed entirely of the selected perovskite compound (or combinations of different perovskite compounds). Alternatively, the perovskite compound can be loaded (e.g., coated) onto a substrate to form the electrode. A variety of substrates may be used, depending upon the electrochemical device and the application. By way of illustration, if the electrode is to be used in a solid oxide fuel cell, the substrate may be a conventional, commercially available electrode for use in solid oxide fuel cells, e.g., $La_{0.75}Sr_{0.25}MnO_3$ (LSM) or $La_{0.625}Sr_{0.375}Co_{0.25}Fe_{0.75}O_3$ (LSCF). A variety of methods may be used to load the perovskite compounds onto such substrates, including the infiltration method described in Example 2, below. Such treated substrates may be referred to as "infiltrated electrodes" or "infiltrated cathodes" in the present disclosure.

Figure 8:
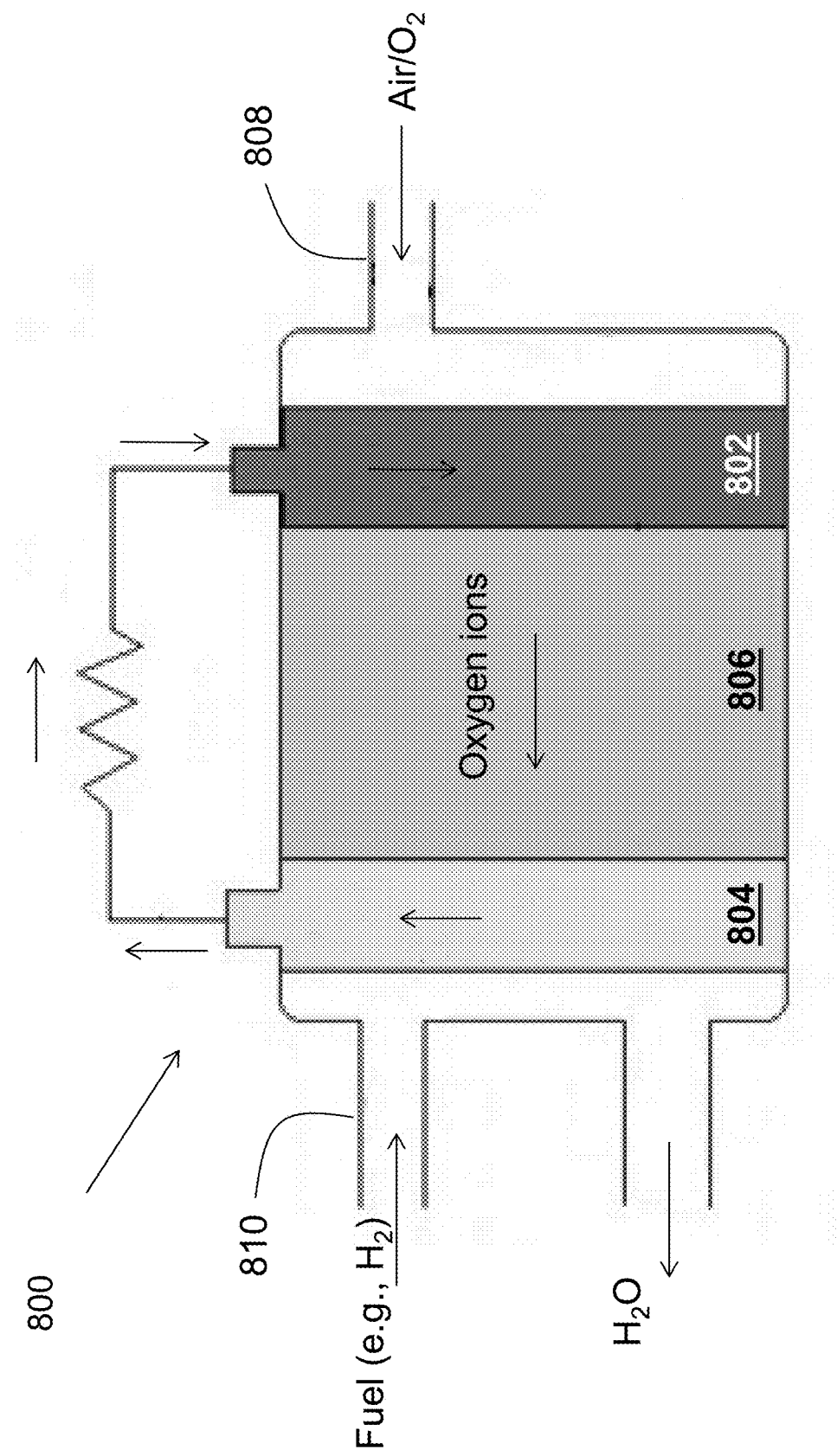
FIG. 8 shows a schematic of a solid oxide fuel cell (SOFC).

In embodiments, the electrochemical device is a solid oxide fuel cell (SOFC). As shown schematically in FIG. 8, an illustrative SOFC 800 includes a cathode 802, an anode 804 and a solid oxide electrolyte 806 between the cathode and the anode. A first inlet 808 in fluid communication with the cathode 802 may be used for introducing air and a second inlet 810 in fluid communication with the anode 804 may be used for introducing a fuel (e.g., including $H_2$). The oxygen reduction reaction (ORR) ($O_2+4e^-\rightarrow 2O^{2-}$) takes place at the cathode while the fuel is oxidized at the cathode. Oxygen ions are transported through the electrolyte. Any of the materials typically used in SOFCs may be used for the anode 804 and the electrolyte 806. As described above, any of the present perovskite compounds (or combinations thereof) may be used for the cathode 802. As described above, the cathode 802 may be an infiltrated cathode including a perovskite compound according to the present disclosure dispersed throughout a conventional cathode substrate.

The present perovskite compounds may be used in methods for catalyzing a variety of electrochemical reactions. In embodiments, the method includes exposing an electrode including any of the present perovskite compounds to a fluid comprising a reactant to be reduced under conditions sufficient to reduce the reactant. In embodiments, the electrochemical reaction is the oxygen reduction reaction (ORR) and the method includes exposing an electrode including any of the present perovskite compounds to a fluid comprising $O_2$ under conditions sufficient to induce the reaction $O_2+4e^-\rightarrow 2O^{2-}$. The conditions may include the temperature, the partial pressure of $O_2$, and the relative humidity as described above. As described in Example 2, below, the present perovskite compounds include those which significantly reduce the resistance of the electrode, thereby increasing the efficiency of $O_2$ reduction and enabling lower operating temperatures. In embodiments, the resistance is reduced by at least 20% relative to a comparative electrode (e.g., one including LSCF/SDC). This includes embodiments in which the resistance is reduced by at least at least 30%, by at least 40%, by at least 50%, by at least 60%, by at least 75%, by at least 80%, or by at least 90% relative to a comparative electrode. The reduction in resistance may be measured using the technique and conditions described in Example 2, below. In embodiments, the temperature under which the method takes place is less than about 800° C. This includes embodiments in which the temperature is no more than about 775° C., no more than about 750° C., no more than about 700° C., no more than about 600° C., no more than about 500° C., or no more than about no more than about 400° C.

Example 1

Introduction

In this Example, high-throughput Density Functional Theory (DFT) methods enabled by the MAterials Simulation Toolkit (MAST),[29,30] combined with multicomponent phase stability analysis using the Python Materials Genomics (Pymatgen)[31] toolkit are used to screen a wide composition space of perovskite materials. Perovskite materials are found which have high values of k* and are stable under typical SOFC operating conditions. Cathode materials with high values of k* generally exhibit high overall ORR activities. As used throughout this specification, the term "ORR operating conditions" signifies high temperature SOFC working conditions, where T=800° C., $P_{O_2}$=0.21 atm and $H_2O$ gas is present with a relative humidity (RH) of RH=100%.

The calculated value of the O p-band center (centroid of the density of states) is used as a descriptor for experimental high-temperature ORR surface exchange coefficients k* for a wide range of perovskite materials.[7,14] Through this bulk descriptor approach, a large number of compounds were screened and perovskite ORR cathodes were found which have a high value of the O p-band center and thus, maximum k* values. In addition, an understanding of which alloying elements act to maximize the activity was obtained, enabling more specific alloy compounds to further maximize the O p-band center. All materials were subject to a full analysis of chemical stability under typical ORR operating conditions to assess their overall applicability as new cathodes. A detailed outline of the material screening steps and candidate elimination criteria are discussed below.

Computation Methods

Material Structures Employed

The main focus of this Example was on perovskite materials having the chemical formula $A_{1-x}A'_xB_{1-y}B'_yO_3$. In total, approximately 1950 distinct perovskite compositions were simulated. Three different structures were modeled in this Example: pseudocubic structure, n=1 Ruddlesden-Popper structure and hexagonal structure. Perovskites that possess rhombohedral (space group R3̄c), orthorhombic (space group Pbnm), or cubic (Pm3̄m) symmetries in the ground state were all quadrupled in size to construct 2×2×2 supercells (40 atoms/cell). In all cases, the structures were fully relaxed (volume+ions). For select perovskite materials that were predicted to have high surface exchange coefficient k* (via a high calculated O p-band center), hexagonal (space group P6$_3$ cm) and Ruddlesden-Popper (general formula $A_2A'_{n-1}B_nO_{3n+1}$ with n=1, space group I4/mmm) variants were also modeled to compare the stability of these competing phases with the perovskite phase. In particular, simulating these competing phases allowed us to determine if they were unstable, able to coexist with the perovskite phase, or potentially destabilize the perovskite phase. When multiple cations are considered on the A- or B-sites the cations were equally distributed among all available A- and B-site containing [001] ([0001] for hexagonal structures) planes in the simulated supercells (i.e., every plane normal to [001] direction ([0001] direction for hexagonal structures) was given the same composition), and compounds containing multiple cations on the A- and/or B-site were ordered along the [001] direction. For example, all compounds with composition $A_{0.75}A'_{0.25}BO_3$ had the same ordering of A' cations along the direction.

Generation of Perovskite Compositions and Materials Screening

This Example considers perovskite materials that represent ternary, quaternary, and quinary compounds. The study was begun with an initial set of ternary and quaternary compounds (described in more detail below). Analysis of predicted activity and calculated stability of this initial set of compounds provided guidance for subsequent materials alloying. In this way, additional sets of quaternary and quinary compounds were analyzed to best explore the relevant composition space which contains perovskite compounds exhibiting the highest stability and predicted activity.

Ternary Compounds:

The perovskite materials screening began with the rare earth and alkaline earth elements (La, Y, Pr, Ca, Sr, Ba) comprising 100% of the A-site and the 3d transition metal row (Sc, Ti, V, Cr, Mn, Fe, Co, Ni, plus Ga) comprising 100% of the B-site, e.g. $YVO_3$, $LaFeO_3$, etc., for a total of 54 ternary perovskite compounds. This initial database of materials was motivated by observing which elements typically comprise perovskite materials over a range of technologically important applications, such as: catalysis and solid oxide fuel cells,[6, 14, 32, 33] oxide electronics,[34-36] transistor dielectrics,[37,38] magnetic tunnel junctions[39,40] and solid state memory.[41,42] The ternary perovskites considered here have A-site and B-site oxidation states (A+/B+) of either the 3+/3+ or 2+/4+ variety. The state of 3+/3+ is attained by selecting a rare earth cation (nominally 3+ oxidation state) on the A-site and 2+/4+ occurs when the A-site is an alkaline earth (nominally 2+ oxidation state) cation. In this way, the B-site cation oxidation state changes from 3+(rare earth on A-site) to 4+(alkaline earth on A-site).

Some of the ternary materials considered here are not stable as the perovskite structure, such as $BaNiO_3$, $CaMnO_3$, etc. However, it is useful to model these compounds as the perovskite structure because the construction of this initial database of 54 compounds enables the extraction of meaningful trends in the O p-band center and chemical stability as a function of both A- and B-site composition. Further, these trends in the O p-band center and chemical stability revealed the most relevant elements needed for creating quaternary and quinary compounds that further maximize the value of k* and chemical stability.

Quaternary Compounds:

The ternary perovskite compounds described above served as a basis set of materials for separate alloying of the A-site and B-site to generate a large set of quaternary compounds. Where applicable, A-site dopants include 25 and 50% site fraction of the rare earth elements La, Y, Pr, Dy, Gd, Ho and Sm and alkaline earth elements Ca, Sr, and Ba; B-site dopants include 12.5, 25 and 50% site fraction of the elements Cr, Mn, Fe, Co, Ni and Mg. The designation of "where applicable" means, for instance, no Pr doping on the A-site was considered for $PrBO_3$-based materials. Based on results of the O p-band center for these preliminary materials, it was found that the $(Ca, Sr, Ba)(Mn, Fe, Co, Ni)O_3$ ternary materials yielded high predicted ORR activities. As a result, three additional subsets of quaternary materials were created. First, the $A(Mn, Fe, Co, Ni)O_3$ (A=alkaline earth Ca, Sr, or Ba) family of materials was further alloyed with 12.5, 25 and 50% B-site fraction of Mn, Fe, Co, Ni (where applicable) to ascertain if mixed B-site alloying of transition metal elements could further improve the activity. Second, $BaFeO_3$ was used as a parent compound to further screen A-site concentrations of 12.5, 25, 50, 75, and 100% using the elements (Ca, Ce, Dy, Gd, Ho, La, Mg, Nd, Pr, Sm, Sr, Bi, Cd, and Sn) and B-site concentrations of 12.5, 25, 50, and 100% using the elements (Al, Cu, Ga, Hf, Ir, Mo, Nb, Os, Pd, Pt, Re, Rh, Ru, Ta, Tc, W, Y, Zn, Zr) to ascertain if these additional elements not previously considered can further increase the activity and provide additional stability to the material. Third, additional quaternary compounds were generated belonging to the family $Ba(Fe, Co, Ni)O_3$ that were doped with 50, 75, and 87.5% B-site fraction of redox-inactive elements Hf, Nb, Zr. In total, the quaternary alloying schemes described here generated a pool of 1263 quaternary perovskite materials.

Quinary Compounds:

As discussed with respect to the generation of the quaternary set of materials and initial results, the set of ternary materials belonging to $(Ca, Sr, Ba)(Mn, Fe, Co, Ni)O_3$ exhibit high activity. A set of quinary compounds was generated by alloying the B-site of these ternary materials with 12.5, 25, and 50% site fraction Mn, Fe, Co, Ni, and, for each of these quaternary materials, further alloying the A-site with 50% of La, Y, Pr, Ca, Sr, and Ba, where applicable. Next, based on additional data of dopant elements which act to create stable compounds that also have high activity, additional quinary compounds were generated belonging to the family $(Pr, Ba)(Fe, Co, Ni)O_3$ that are doped with 50, 75, and 87.5% B-site fraction of redox-inactive elements Hf, Nb, Zr. Finally, small subsets of additional quinary materials were generated over the course of this study to test different alloying elements based on promising parent compounds. These additional subsets are too numerous to list here. In total, the quinary alloying schemes described here generated a pool of 612 quinary perovskite materials.

Screening Process and Material Elimination Criteria:

The sequential steps of the screening process and elimination criteria are summarized here. First, a wide composition space of perovskite materials was generated and simulated. The surface exchange coefficient k* was analyzed using the O p-band center as a descriptor for k*, and materials were eliminated that had a value of k* that was less than the experimentally measured k* value of $La_{0.625}Sr_{0.375}Co_{0.25}Fe_{0.75}O_3$ (LSCF), which is a commercial cathode material for SOFCs. Next, the chemical stability was analyzed using the phase stability analysis tools contained in Pymatgen under ORR operating conditions, and any materials with a stability greater than 40 meV/(formula unit) above the convex hull were eliminated from consideration. The final elimination criterion was to remove any compounds that possessed a nonzero bandgap or charge transfer gap, thus eliminating materials which would be poor conductors. The application of each successive elimination criteria reduced the total pool of compounds. Such perovskite compounds will find use in a variety of applications, including as SOFC cathodes.

Density Functional Theory Calculations

All total energy and electronic structure calculations in this Example were performed using Density Functional Theory (DFT) as implemented by the Vienna Ab Initio Simulation Package (VASP).[43] The DFT calculations were automated in a high-throughput manner by using the Materials Simulation Toolkit (MAST), which interfaces directly with VASP.[29,30] A planewave basis set was used to represent the electron wavefunctions, and the planewave cutoff energy was set to be 30% larger than the highest pseudopotential planewave cutoff energy. The Perdew-Burke-Ernzerhof (PBE)-type pseudopotentials[44] utilizing the projector augmented wave (PAW)[45] method were used to represent each element type. In general, all specific pseudopotentials used are the same as those used within Pymatgen and the Materials Project, so that consistent calculations of phase stability were obtained.[46] For all calculations, the generalized gradient approximation (GGA) was used as the exchange and correlation functional. For materials containing transition metals, the Hubbard U correction method (GGA+U)[47] was implemented with effective U values equal to those used in the Pymatgen package and Materials Project.[31,48] The U values are tabulated in Table S-1 in the Supplemental Details, below. The Monkhorst-Pack scheme was used for the reciprocal space integration of the Brillouin zone for all materials.[49] Reciprocal space k-point meshes of 4×4×4, 2×2×2, and 4×4×2 were used for all perovskite (40 atoms/cell), hexagonal (120 atoms/cell), and Ruddlesden-Popper (56 atoms/cell) material phases, respectively. For all calculations, the choices of k-point mesh and planewave cutoff energy result in total energy convergence of approximately 1 meV/supercell, and all calculations were done with spin polarization enabled.

The O p-band center was calculated as the centroid of the densities of states (DOS) projected onto the 2p orbitals of the O atoms using the following equation:

$$\overline{O}_{2p} = \frac{\int_{-\infty}^{\infty} E \cdot D_{O_{2p}}(E) dE}{\int_{-\infty}^{\infty} D_{O_{2p}}(E) dE} - E_{Fermi},$$

where $\overline{O}_{2p}$ is the O p-band center, E is the electron energy, $D_{O_{2p}}(E)$ is the DOS projected onto the 2p orbitals of O, and the integrals are taken over all states. All calculated values of the O p-band center are given with respect to the Fermi energy $E_{Fermi}$.

The electronic bandgap and charge transfer gap were calculated using the projected densities of states for each material. The bandgap is the energy difference between the highest filled electronic state (i.e., the Fermi level in DFT calculations) and the lowest unoccupied energy state. The definition of the charge transfer gap differs slightly from the electronic bandgap. Following the work of Ref 50, the charge transfer gap was calculated to be the energy difference between the highest filled O 2p state and the lowest unoccupied O 2p state. A small value of the charge transfer gap between occupied and unoccupied O states is understood to more efficiently facilitate charge transfer between O atoms reacting at the perovskite surface during catalysis (i.e., the material is a better conductor).[50, 51]

Material Databases and Phase Stability Calculations

The database of calculated materials in the Materials Project and Pymatgen were created almost entirely using entries from the Inorganic Crystal Structure Database (ICSD). As of the end of 2012, more than 80,000 compounds have been calculated and tabulated in the Materials Project database.[48] Many of the base perovskite compounds that are part of the undoped ternary structures (e.g. $LaCrO_3$, $PrNiO_3$, etc.) are contained in these databases. However, the doped quaternary (e.g. $La_{0.75}Sr_{0.25}MnO_3$) and quinary (e.g. $Ba_{0.5}Sr_{0.5}Co_{0.75}Fe_{0.25}O_3$) perovskites, as well as most hexagonal and Ruddlesden-Popper phases, are not present in these databases at this time. For oxide materials, the Materials Project and Pymatgen databases consist of DFT-calculated energies for each material. These DFT energies are all at conditions of T=0 K, but have been shifted using known corrections for the gaseous $O_2$ species. In this way, the DFT-calculated T=0 K solid phase energies are shifted using the temperature and pressure dependence of the gas species, and are an approximation for standard conditions of T=298 K and P=1 atm. Additional details of how this energy shift is used for oxide materials is discussed in the Supplementary Details, below.

The high temperature chemical phase stability of all compounds screened in this study was analyzed using the multicomponent phase diagram modules contained within the Pymatgen package (version 4.2.0).[31] More information about how to use Pymatgen to conduct multicomponent phase stability analysis is provided in the Supplementary Details, below. It was assumed that every potential high temperature SOFC cathode material would be subject to an environment that is open both to $O_2$ and $H_2$, consistent with possible reactions with oxygen and water vapor. The chemical potential of $O_2$ was set such that the temperature was equal to 800° C. (1073 K) and the partial pressure of $O_2$ was equal to 0.21 atm. The chemical potential of $H_2$ is set by the chemical potential of $O_2$ and equilibrium with $H_2O$ vapor at 1073 K. A humid operating environment with a relative humidity (RH) of 100% was assumed which is an approximate value for the amount of $H_2O$ present in ambient air which is often the source of $O_2$ gas for high temperature SOFC operation.[52, 53] It was found that changing the RH between relatively dry (RH=30%) conditions and an RH value of 100% does not qualitatively impact any of the conclusions regarding the discovery of new SOFC cathode materials. More information on how these chemical potentials were calculated can be found in the Supplementary Details, below.

For all phase stability calculations, the calculated DFT total energies for each compound must be shifted to account for various corrections used within the Pymatgen framework. These shifts include (1) the gas phase $O_2$ shift and DFT overbinding corrections (which are applied to the solid phase energies),[54] and (2) the solid phase energy shift needed when phase stability calculations consist of some materials modeled by GGA and others by GGA+U (e.g. a GGA calculation of metallic Fe and GGA+U calculation of $LaFeO_3$ in the La—Fe—O system).[55] More information on the details of these energy shifts can be found in the Materials Project online documentation and in the Supplemental Details below.[46]

Results and Discussion

Effect of Composition on O p-Band Center and Stability

Figure 1B:
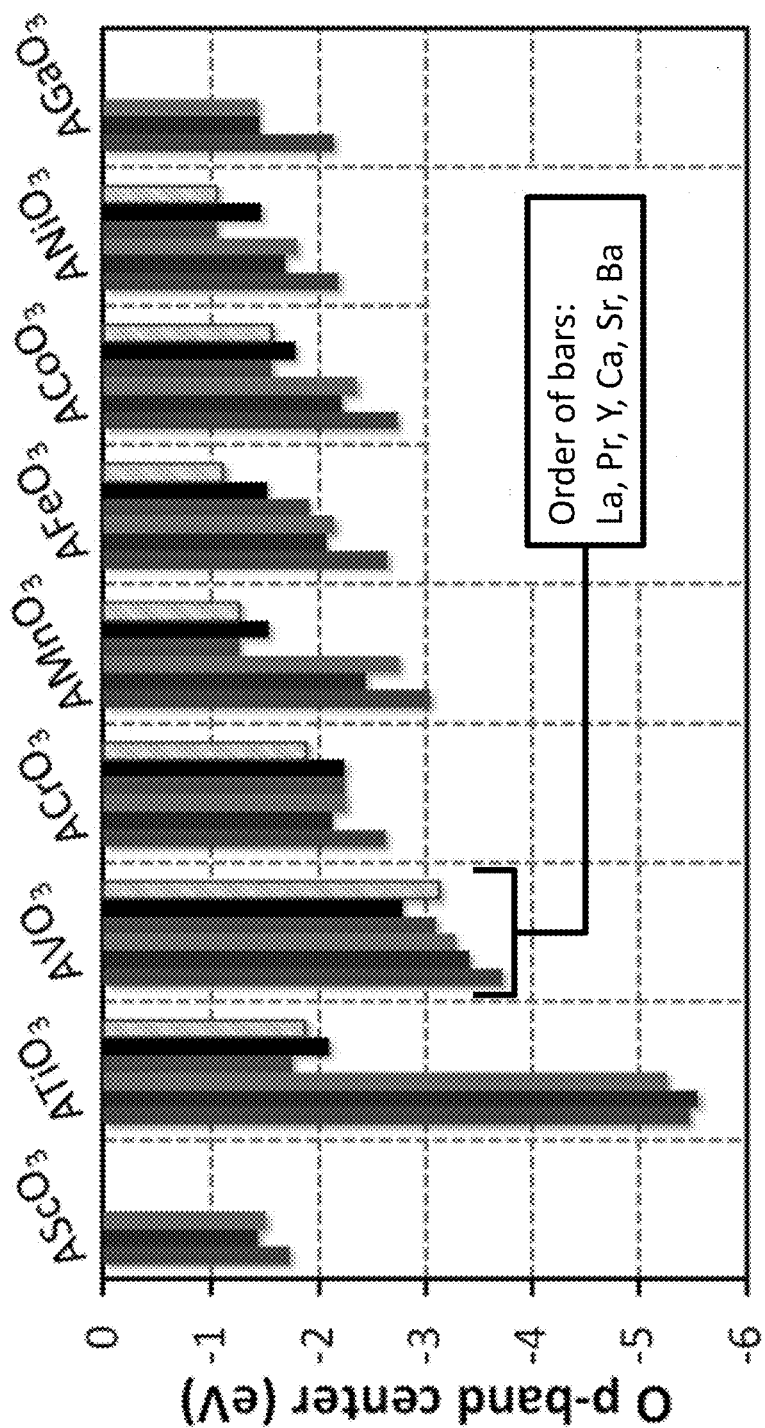

To gain a further understanding of how altering the composition of a perovskite material quantitatively affects the value of the O p-band center, and thus, the value of the surface exchange coefficient k*, the O p-band center for the initial set of ternary perovskite compounds was calculated. A graphical summary of these variations in O p-band as a function of A-site element (fixed B-site element) and as a function of B-site element (for fixed A-site element) is provided in FIGS. 1A and 1B, respectively. Generally, one wants to maximize the value of the O p-band center, as this correlates to a higher value of k*. FIG. 1A shows that materials containing a rare earth element on the A-site generally have lower values of the O p-band center while materials with an alkaline earth element on the A-site have higher O p-band centers. In addition, for fixed A-site, the value of the O p-band center tends to increase as the B-site element proceeds from left to right across the periodic table. Finally, materials which are band insulators such as $LaScO_3$, $PrGaO_3$, etc. also have high O p-band centers. Highly insulating materials like $LaScO_3$ have a high O p-band center but are not expected to be good ORR catalysts due to their insufficient conductivity. FIG. 1B reinforces these trends. To maximize the value of the O p-band center, it is advantageous to have alkaline earth elements such as Ca, Sr and Ba on the A-site and late transition metal elements such as Mn, Fe, Co and Ni on the B-site.

Figure 2A:
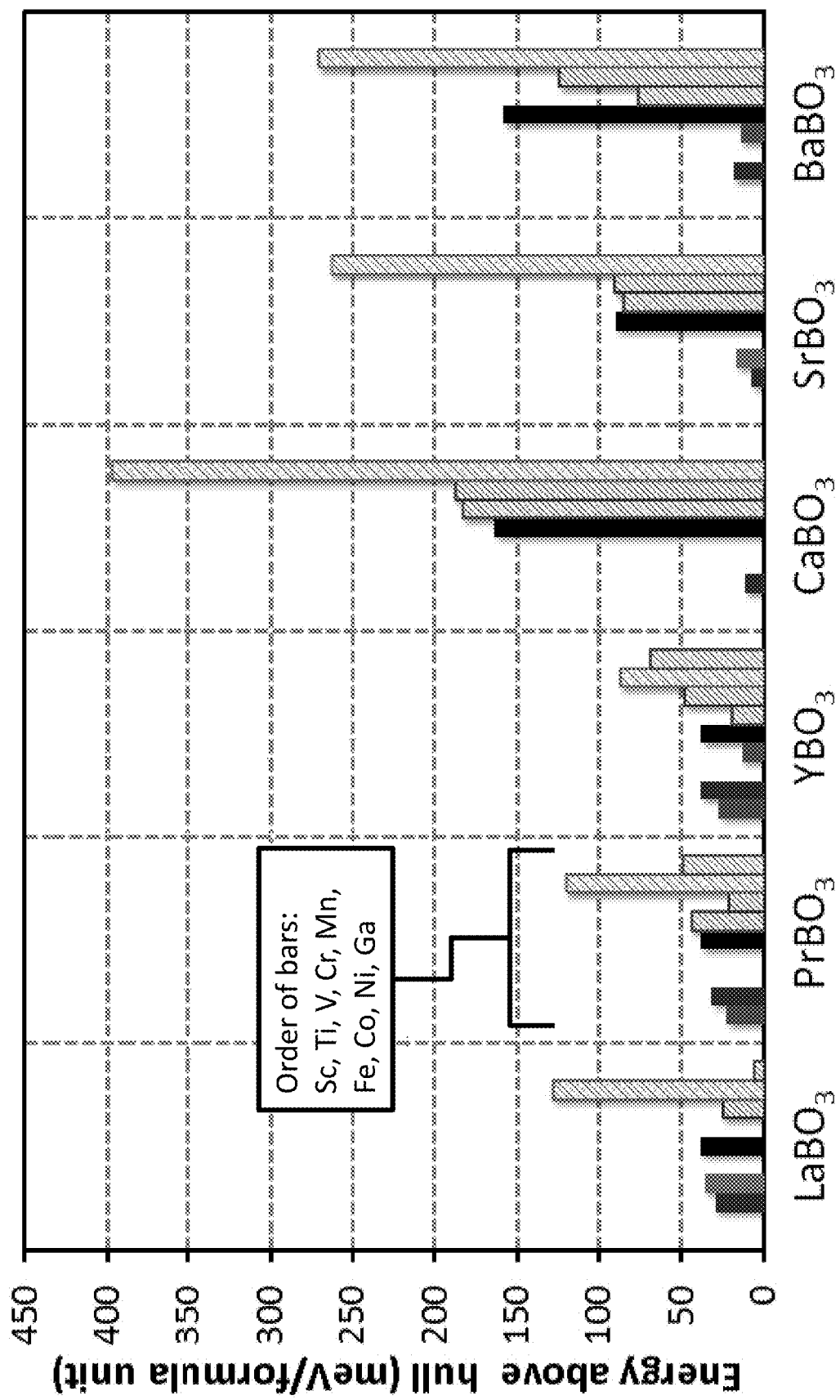
FIGS. 2A-B illustrate the trend of calculated stability (as energy above the convex hull) under typical ORR operating conditions as a function of composition for materials with (FIG. 2A) different B-site elements with constant A-site element and (FIG. 2B) different A-site elements with constant B-site element. A low value of the energy above the convex hull indicates higher thermodynamic stability, which is indicative of longer SOFC cathode lifetime since the material is less prone to phase decomposition. The order of the bars is indicated using $PrBO_3/ANiO_3$ as examples.
Figure 2B:
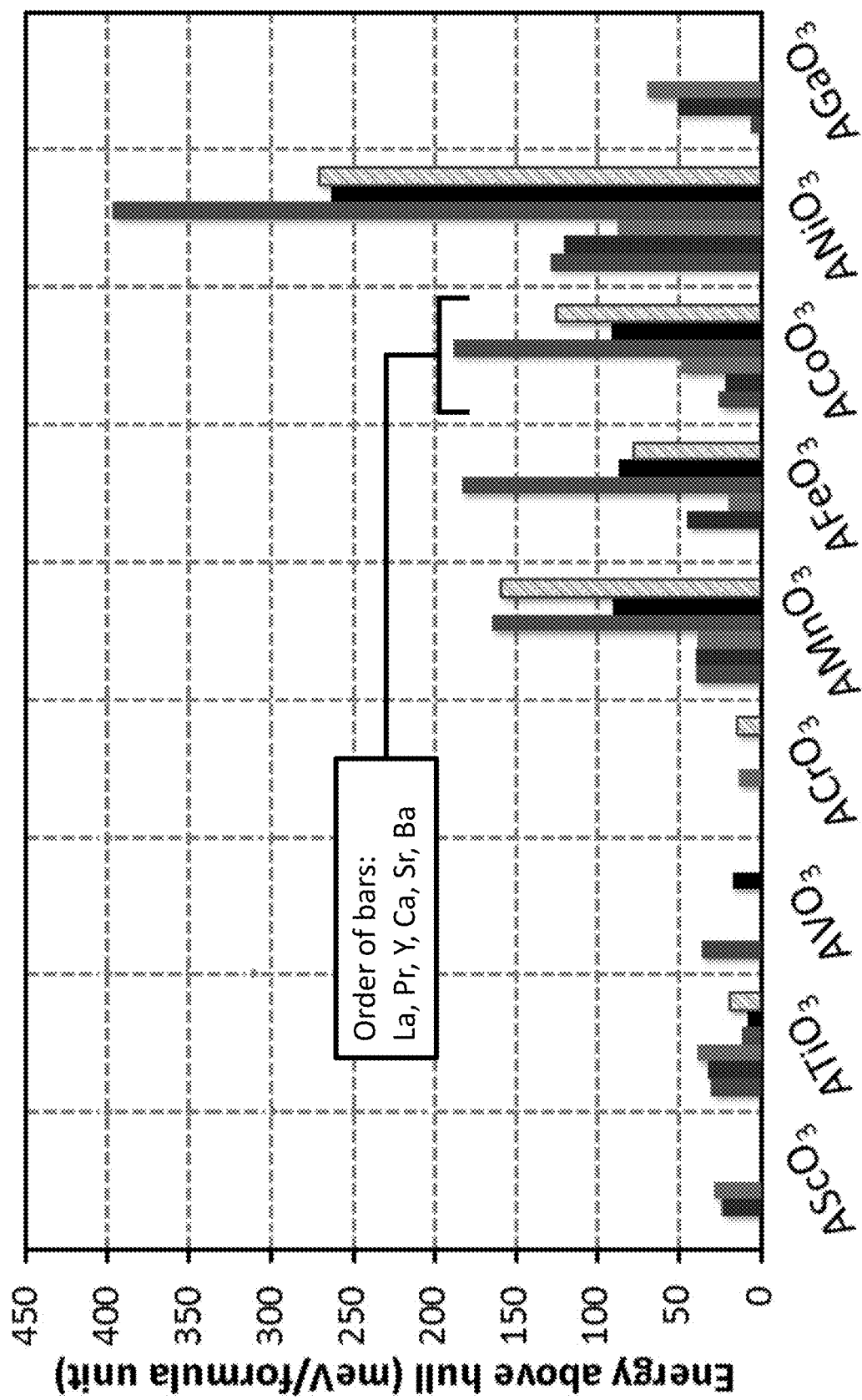

In an analogous manner to the analysis of trends in O p-band center, the thermodynamic stability under typical ORR operating conditions as a function of composition was analyzed. FIGS. 2A and 2B provides a summary of the trends of stability as a function of changing B-site element with constant A-site element (FIG. 2A), and stability as a function of changing A-site element with constant B-site element (FIG. 2B). As shown in FIG. 2A, materials containing a rare earth element on the A-site tend to exhibit greater stability compared to materials containing an alkaline earth element on the A-site. In addition, for fixed A-site, the stability tends to decrease (the energy above the convex hull increases) as the B-site element proceeds from left to right across the periodic table. FIG. 2B reinforces the stability trends discussed above. In particular, it is clear that late transition metal elements such as Fe, Co and Ni result in destabilization of perovskites. Overall, to maximize the stability of perovskites, it is best to include rare earth elements on the A-site and early transition metal elements on the B-site. The highly insulating materials are also very stable, but once again are not expected to be good ORR catalysts.

The compositional trends in O p-band center and stability depicted in FIGS. 1A-1B and 2A-2B are useful as they enable a focus of subsequent materials screening on a narrowed composition space. Generally, it is desirable to find new perovskite compounds that can have high ORR activity from a high O p-band center and simultaneously exhibit good thermodynamic stability by having a low energy above the convex hull under ORR operating conditions. Based on the trends in O p-band center and stability shown in FIGS. 1A-1B and 2A-2B, it is clear that as the O p-band center and thus ORR activity is increased, the stability simultaneously decreases. Therefore, there is a fundamental tradeoff between maximizing both the activity and stability of perovskite compounds to catalyze the ORR. This trade-off between ORR activity and material stability is why a typical commercial SOFC cathode material like $La_{0.625}Sr_{0.375}Co_{0.25}Fe_{0.75}O_3$ (LSCF) has a lower activity but better stability than a state-of-the-art material like $Ba_{0.5}Sr_{0.5}Co_{0.75}Fe_{0.25}O_3$ (BSCF). It has been shown experimentally that BSCF exhibits very high activity but suffers from stability problems.[6,11, 12] The k* value of BSCF is approximately 200× higher than LSCF at T≈1000K, and the calculated stabilities of BSCF and LSCF are 124 meV/(formula unit) and 47 meV/(formula unit), respectively. Overall, perovskites capable of exhibiting high activity and high stability should contain a mixture of alkaline earth and rare earth elements on the A-site and a mixture of late transition metals and less redox-active elements on the B-site.

Predicted ORR Activity from the O p-Band Center Descriptor

Figure 3:
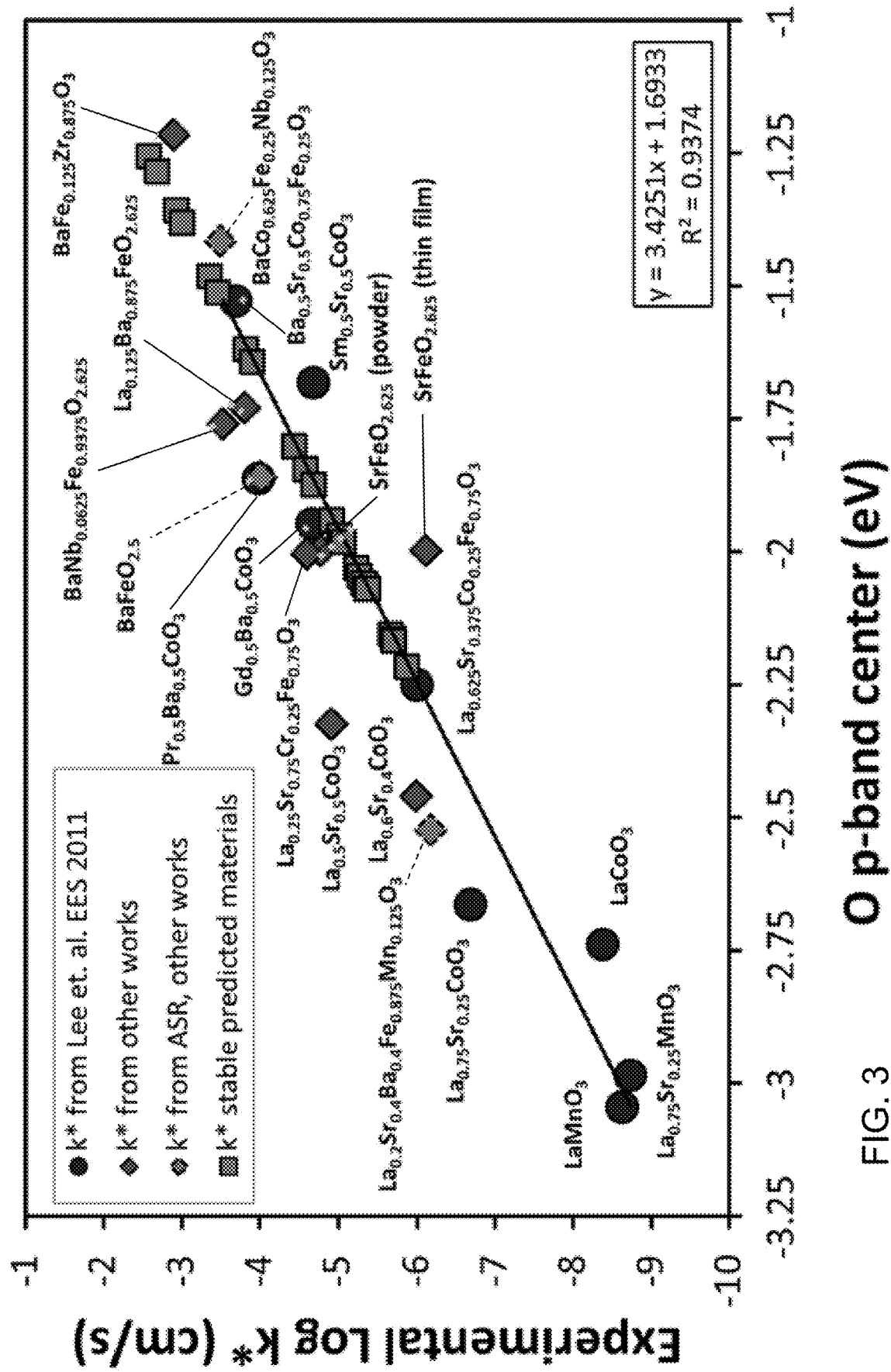
FIG. 3 is a plot of surface exchange coefficient log k* (in cm/s) as a function of calculated O p-band center (in eV). The O p-band center values are given relative to the Fermi energy for each material. The circle and diamond/solid line symbols are experimental surface exchange coefficient data. The line of best fit is made from the materials comprising the circle symbols, which were obtained from Ref. 14. References for the experimental k* data for the diamonds are as follows: $La_{0.6}Sr_{0.4}CoO_3$: Ref 15, $La_{0.5}Sr_{0.5}CoO_3$: Refs. 16, 17, $La_{0.25}Sr_{0.75}Cr_{0.25}Fe_{0.75}O_3$ (LSCrF): Ref. 18, $SrFeO_{2.625}$ (SF): Ref 18 (powder), Ref. 19 (thin film), $La_{0.0625}Ba_{0.9375}FeO_{2.625}$ (LBF): Ref 20, $BaNb_{0.0625}Fe_{0.9375}O_{2.625}$ (BFN): Ref 21, and $BaFe_{0.125}Zr_{0.875}O_3$ (BFZ): Ref 22, 23. The k* data for the diamond/dotted line symbols was obtained by using ASR data reported for $La_{0.2}Sr_{0.4}Ba_{0.4}Fe_{0.875}Mn_{0.125}O_3$ (LSB-FMO): Ref 24, $BaFeO_{2.5}$ (BF): Ref 25, and $BaCo_{0.625}Fe_{0.25}Nb_{0.125}O_3$ (BCFN): Ref. 26. The square symbols were plotted using log k* values based on the linear fit of the experimental data. Many of the references listed above reported values of $k_{chem}$, which is related to $k^*$ through the relation $k^*=k_{chem}x_{V_o}$, where $x_{V_o}$ is the concentration of oxygen vacancies in the material following Ref 27.

To obtain a quantitative relationship between the calculated bulk O p-band center and the experimental surface exchange coefficient k*, a line of best fit is plotted for a series of perovskite materials whose experimental surface exchange coefficients have been measured. These data were obtained from Ref 4 and references therein at a temperature of T≈1000 K and $P_{O_2}$≈0.2 atm. The plot of k* versus calculated O p-band center is shown in FIG. 3. The circles and diamonds denote materials with experimentally measured k* values. The k* data for materials comprising the circles were obtained from Ref 14 and the k* values for materials comprising the diamonds were obtained from the references provided in the caption of FIG. 3. The materials shown with squares are the new cathode materials which passed all screening elimination criteria (see Table 1, above, for the list of these materials). These data were plotted using the line of best fit shown in FIG. 3. Additionally, data of area-specific resistance (ASR) were obtained for $La_{0.2}Sr_{0.4}Ba_{0.4}Fe_{0.75}Mn_{0.25}O_{3-\delta}$ (LSBFM)[24], $BaFeO_{3-\delta}$ (BF)[25] and $BaCo_{0.7}Fe_{0.3-x}Nb_xO_{3-\delta}$ (BCFN)[26], but no data of surface exchange were found for these materials. As no experimental k* data for these materials is available, the reported ASR and k* data from Ref 14 were used to convert the measured ASR values to k* values (a plot of experimental k* versus ASR data in Ref 14 is linear). The extracted k* values from ASR measurements for LSBFM, BF and BCFN are shown as diamonds/dotted lines in FIG. 3. The ASR values for these materials were measured to be very close to ASR values of LSCF (for LSBFM) and BSCF (for BF and BCFN), respectively, suggesting that they might have similar k* values The extracted values of k* for LSBFM, BF and BCFN in fact place them very close to LSCF (for LSBFM) and BSCF (for BF and BCFN), respectively, which further corroborates the established trend of k* versus O p-band center. By including all of the diamond/ solid line points and diamond/dotted line points comprising the ASR data of BF, LSBFM and BCFN there are an additional eleven points to supplement the original nine from Ref 14 that strongly support the trend originally identified in Ref. 14. The materials LBF[20], BFN[21], and BFZ[22, 23] all have experimental k* values which are on par or exceed BSCF. In addition, the experimental k* values of SF and LSCrF obtained from Ref 18 also fit closely to the established trend. From the current screening study, the materials LBF, BFN and BFZ all have high predicted k* values. However, all of these materials fail the subsequent screening criteria of either sufficient stability or because they have a nonzero electronic bandgap. These findings suggest that while LBF, BFN and BFZ are promising materials for SOFC cathodes, they may suffer from long-term stability problems if they were to be in operation for thousands of hours. Some of the materials listed in Table 2, above, are related in composition to materials like LBF, BFZ, BFN and BSCF, but have additional dopant elements that render these materials more stable than those already experimentally investigated.[20-23, 56, 57]

Phase Stability Under ORR Operating Conditions

The stability of the 1950 perovskite materials simulated in this Example was analyzed under SOFC ORR operating conditions of T=1073 K, $P_{O_2}$=0.21 atm, and RH=100% using the Pymatgen toolkit. The stability of each material was calculated as the energy difference above the convex hull, in meV/(formula unit). Materials that are calculated to be on the convex hull (i.e. 0 meV/(formula unit) above the hull) are stable under ORR conditions. While materials that are above the convex hull are technically not stable, an error bar of 40 meV/(formula unit) resulting from typical DFT errors is reasonable.[58,59]

Figure 4:
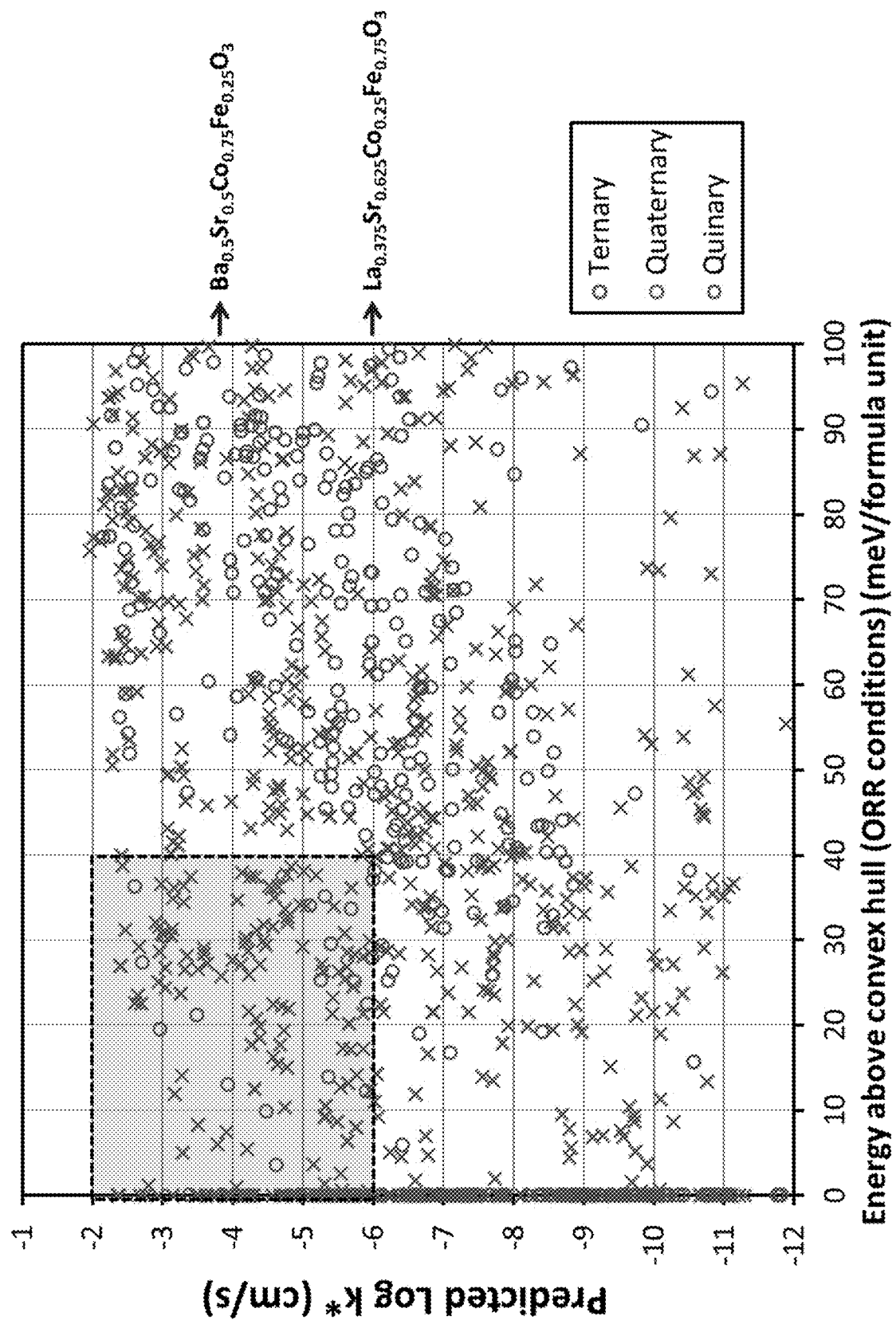
FIG. 4 is a plot of surface exchange coefficient log $k^*$ values as a function of stability under high temperature ORR conditions (T=1073 K, $P_{O_2}$=0.2 atm, relative humidity=100%), given as the energy above the convex hull from Pymatgen phase diagram calculations. The red, blue and purple symbols represent perovskite compositions that are ternary, quaternary, and quinary alloys, respectively. The materials marked with "x" symbols are insulating, while those with "o" symbols are metallic. The values of log $k^*$ for the common commercial cathode material $La_{0.625}Sr_{0.375}Co_{0.25}Fe_{0.75}O_3$ (LSCF) and state-of-the-art $Ba_{0.5}Sr_{0.5}Co_{0.75}Fe_{0.25}O_3$ (BSCF) are indicated by the blue arrows. The materials screening yielded many materials with $k^*$ values higher than LSCF (indicating better performance than LSCF), some of which are stable under high temperature ORR conditions. This region of high activity and stability within 40 meV/(formula unit) of the convex hull is highlighted with a shaded box.

FIGS. 4A-B contain plots of the values of k* (from the O p-band calculations) as a function of the energy above the convex hull. FIG. 4A shows data of all perovskite compounds simulated in this Example. The symbol colors represent different families of perovskite compounds based on the number of alloying elements: ternary systems (blue), quaternary systems where the parent materials contain rare earth elements on the A-site (green), quaternary systems where the parent materials contain alkaline earth elements on the A-site (purple), and quinary compounds (red). Materials denoted with an "x" symbol are insulating, i.e., they fail elimination criterion 3. Materials denoted with an "o" symbol pass elimination criterion 3. The green highlighted region of FIG. 4A is the region containing materials that have k* values higher than LSCF (they pass elimination criterion 1) and have calculated stabilities within 40 meV/(formula unit) of the convex hull (they also pass elimination criterion 2). Also indicated on FIG. 4A are the approximate k* values for LSCF (log k*~−6.0 cm/s) and BSCF (log k*~−3.8 cm/s). Since LSCF is one of the best and most widely-implemented SOFC cathode materials and BSCF is one of the highest activity ORR materials known to date, they both represent significant milestones of performance. Any materials with performance above LSCF may be a replacement for LSCF enabling improved performance. The data of FIG. 4A clearly show that there are many compounds with surface exchange rates which exceed BSCF, and there are an even greater number of materials with surface exchange rates above LSCF. Both of these material groups are interesting as they show higher ORR activity than the widely-used LSCF and have stabilities that are superior to BSCF, which is 124 meV/(formula unit) above the convex hull. FIG. 4B shows the green-highlighted portion of FIG. 4A only containing materials which pass all elimination criteria. The materials are also listed in Table 2, above. The data shown in FIGS. 4A-B also reinforce the trends in O p-band center and stability as a function of composition from FIGS. 1A-B and 2A-B. Generally, materials with alkaline earth elements on the A-site possess higher values of k* (and thus O p-band center), but are less stable. On the other hand, materials containing rare earth elements on the A-site tend to have higher stability but lower values of k*.

Table 2, above, contains the list of materials from FIGS. 4A-B that have activities better than LSCF (they pass elimination criterion 1) and are <40 meV/(formula unit) of the convex hull (they pass elimination criterion 2). In addition, the materials in Table 2, above, were calculated to have no bandgap or charge transfer gap (they pass elimination criterion 3), making the collection of materials in Table 2, above, the most physically relevant set of materials for ORR. Generally speaking, the materials in Table 2, above, contain A-site compositions that are either entirely an alkaline earth element (particularly Ba), or a mixture of alkaline and rare earth elements. The B-site of materials in Table 2, above, are predominantly occupied by late transition metals such as Fe and Co. In addition, many of these top performing materials also contain a redox-inactive element on the B-site, such as Zr, Hf, Ta, Nb or Re. The inclusion of these redox-inactive cations provides increased stability without sacrificing the high catalytic activity.

Competing Stability of Hexagonal and Ruddlesden-Popper Materials

Figure 5:
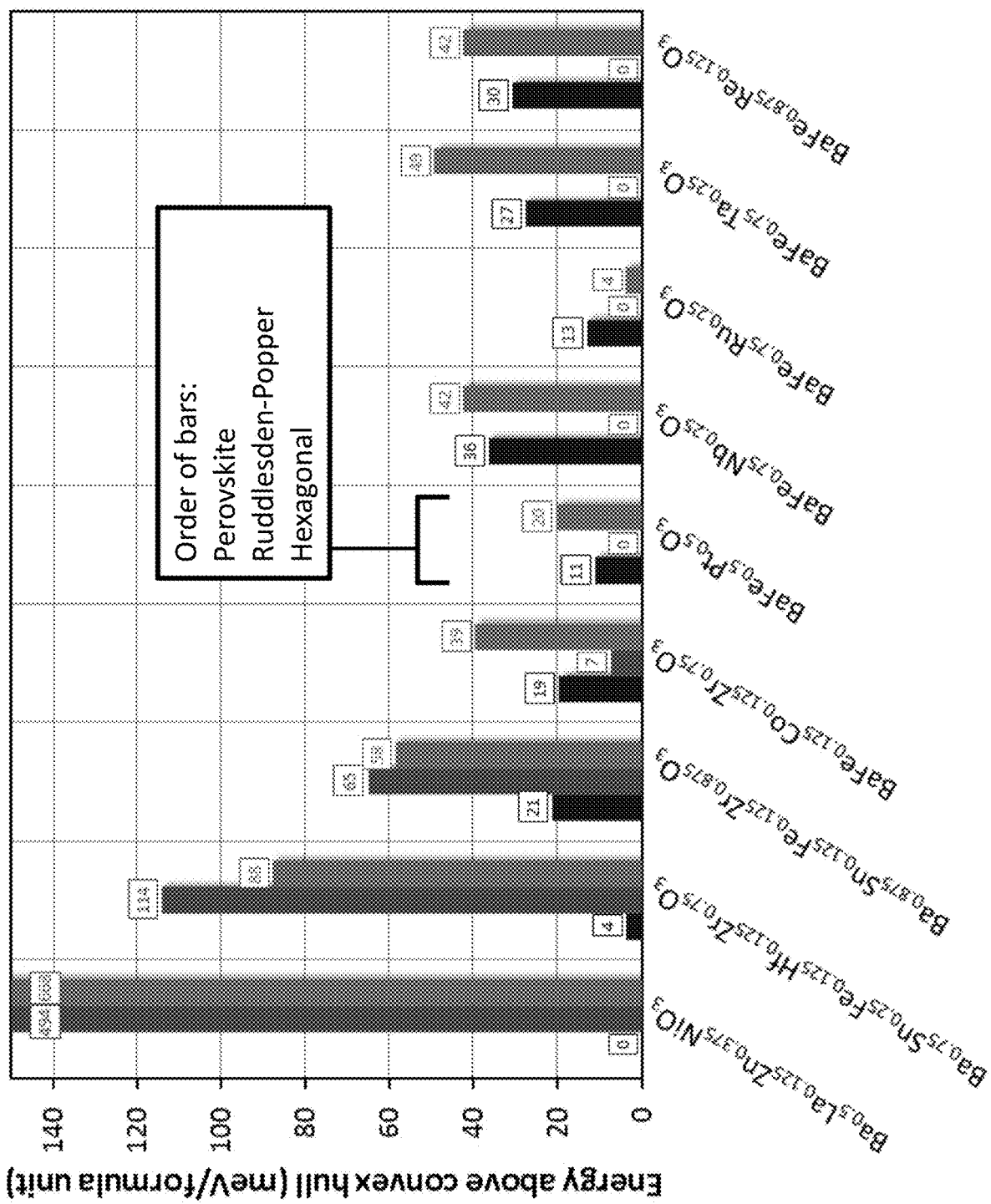
FIG. 5 is a comparison of calculated stability between perovskite, Ruddlesden-Popper and hexagonal phases. The materials listed here are the top nine highest $k^*$ materials from the screening process as summarized in Table 2.

For some of the compounds of Table 2, above, the hexagonal and Ruddlesden-Popper (n=1) phases were also simulated. Due to the large number of perovskite structures, a representative set of nine compounds was simulated, those material compositions whose k* values are on par or higher than BSCF (k*≈−3.8 cm/s). FIG. 5 provides a summary of the calculated stability under ORR operating conditions for the perovskite, Ruddlesden-Popper and hexagonal phases of these top performing materials. These calculations were performed to determine if the perovskite phase may be destabilized by the competing hexagonal and Ruddlesden-Popper phases. Overall it was found for each case that the perovskite phase was not destabilized (i.e., pushed above the 40 meV/(formula unit) stability criterion) by the presence of the Ruddlesden-Popper phase. On the other hand, some hexagonal materials were nearly degenerate in energy with their perovskite variants. The average energy difference between hexagonal and perovskite phases is only about 5 meV/atom and thus within the calculation error bars. Due to the near-degeneracy of perovskite and hexagonal structures for some compounds, synthesis of these compounds may result in a two-phase mixture of perovskite and hexagonal phases. The perovskite phase may be isolated by maintain control of synthesis conditions and with post-synthesis processing steps such as high temperature heat treatment and multiple iterations of grinding/sintering of synthesized powders. Overall, the exact experimental methods needed to produce phase-pure perovskite materials will be a function of the material composition considered.

SUMMARY AND CONCLUSIONS

In this Example, high-throughput density functional theory-based screening of approximately 1950 perovskites was conducted to identify stable and highly active ORR cathode materials. The bulk oxygen p-band center was used as an electronic structure descriptor for the surface exchange coefficient k*, which is correlated to the overall ORR activity. The thermodynamic phase stability was analyzed under typical ORR operating conditions using the phase stability analysis tools contained in the Pymatgen toolkit. Materials were systematically eliminated which did not pass each of the established elimination criteria: (1) material has a predicted k*<LSCF, (2) material has a calculated stability >40 meV/(formula unit) above the convex hull, and (3) material has a nonzero electronic bandgap or charge transfer gap. Of the materials examined here, Table 2, above, includes the cathode materials that have passed each of the screening criteria, with top materials including the following: $BaFe_{0.75}Nb_{0.25}O_3$, $BaFe_{0.75}Ta_{0.25}O_3$, $BaFe_{0.125}Co_{0.125}Zr_{0.75}O_3$, $BaFe_{0.875}Re_{0.125}O_3$, and $Ba_{0.625}La_{0.125}Zn_{0.375}NiO_3$.

In addition to the discovery of new SOFC cathode materials to efficiently catalyze the ORR reaction, the O p-band center descriptor and stability analysis has been used to examine the qualitative dependence of k* and stability on the A- and B-site composition. Broadly, the inclusion of alkaline earth elements on the A-site will increase the value of the O p-band center and thus k*, but will simultaneously tend to destabilize the material. The inclusion of late transition metal elements on the B-site, such as Fe, Co and Ni, will also tend to increase k* and decrease stability.

The present results also serve to improve the activity and stability of known compounds. If one has a high activity perovskite alloyed purely from alkaline earth elements on the A-site and late transition metals on the B-site (a canonical example of which is BSCF), the material most likely becomes unstable over time. Improving the stability of a material like BSCF without dramatically reducing its activity can be accomplished by alloying the A-site with a small fraction of rare earth elements, and/or alloying the B-site with some redox-inactive elements such as Zr, Hf, Nb, Ta or Re.

Supplementary Details

Energy Shifts Used in Phase Stability Analysis

In order to use the Materials Project and Pymatgen for phase stability analysis, two energy shifts must be employed. In the next paragraph, the $O_2$ gas correction is first discussed, followed by a discussion of the shifts needed when mixing GGA and GGA+U calculations.

The $O_2$ gas shift is necessary as DFT methods tend to overbind the $O_2$ molecule. As a result, the formation energies for oxides tend to be higher (i.e., more positive, less stable) than experimental values suggest. Previous work has studied this $O_2$ gas shift in detail. 32, 54, 60 In the present Example, the shift employed by Materials Project and Pymatgen was used so that the shifted energies were consistent with these databases. This energy shift is 0.7023 eV/O, and is subtracted from the DFT calculated solid phase energy. For example, if the DFT calculated energy of $LaScO_3$ is −43.933 eV/formula unit, the shifted energy would be −43.933 eV/formula unit−(3 O/formula unit)(0.7023 eV/O)=−46.040 eV/formula unit. It is important to note that this $O_2$ gas shift is dependent on the exchange-correlation functional used. In this study, PAW-PBE type pseudopotentials are used, again to stay consistent with Materials Project and Pymatgen databases.

The second shift needed to conduct phase stability analysis is only relevant for GGA+U calculations. This shift is required because phase stability of compounds modeled with GGA+U will also draw upon materials modeled solely with GGA. For instance, in the La—Fe—O system, metallic Fe is modeled with GGA, however the $LaFeO_3$ perovskite is modeled with GGA+U. The details of these mixed GGA/GGA+U calculations is given in Ref. 55. These energy shifts are subtracted from the calculated DFT energies. For example, if $LaFeO_3$ has a DFT calculated energy of −38.183 eV/formula unit, then the shifted energy, accounting for both the $O_2$ gas shift and the GGA/GGA+U mixing shift, would be −38.183 eV/formula unit−(1 Fe/formula unit)(2.733 eV/Fe)−(3 O/formula unit)(0.7023 eV/O)=−43.023 eV/formula unit. This GGA/GGA+U mixing shift is dependent on the transition metal element and the U value used. All U values and GGA/GGA+U mixing shifts used in this study are listed below in Table S-1 and they are the same values used in the Materials Project and Pymatgen databases.

TABLE S-1

Collection of U values and GGA/GGA + U energy shifts used in this Example.

| Element | U (eV) (J = 0 eV for all) | GGA/GGA + U shift (eV/atom) |
|---------|---------------------------|-----------------------------|
| V       | 3.25                      | 1.682                       |
| Cr      | 3.7                       | 2.013                       |
| Mn      | 3.9                       | 1.681                       |
| Fe      | 5.3                       | 2.733                       |
| Co      | 3.32                      | 1.874                       |
| Ni      | 6.2                       | 2.164                       |

Using Pymatgen to Conduct Phase Stability Analysis of Open Systems

The Python Materials Genomics (Pymatgen) toolkit is a set of materials analysis tools written in the Python programming language, and forms the basis of the Materials Project database.[31] For the stability analysis in this work Pymatgen version 4.2.0 was used. To conduct the stability analysis, the PhaseDiagram class was used within the pymatgen.phasediagram.maker module. The PhaseDiagram class requires information on the elements present, material composition, and (optionally) the chemical potential of gaseous reacting species if one is interested in environmental conditions different from DFT conditions. The information of material composition and energy are used in the PDEntry class from the pymatgen.phasediagram.entries module. Properly representing the data of material composition in the PDEntry class requires the use of the Composition class within the pymatgen.core.composition module. The energies of the materials used in the phase diagram analysis are the calculated DFT energies which have been appropriately shifted using the O energy shift and GGA/GGA+U mixing shifts described in this Supplementary Details section, above. Once the phase diagram for the system of interest is created, the PDAnalyzer class in the pymatgen.phasediagram.analyzer module is used to compute the energy above the convex hull at the relevant composition in the phase diagram.

It is noted that if one simply uses the default chemical potential values for $O_2$ and $H_2$, these chemical potentials are equal to their DFT-calculated values. Thus, the thermodynamic conditions under consideration for the phase stability analysis correspond to DFT conditions but with energy shifts applied to all compounds (as discussed in this Supplementary Details section, above) which corresponds approximately to room-temperature conditions. These conditions are more oxidizing than typical high temperature ORR operating conditions of solid oxide fuel cells, thus the calculated $O_2$ and $H_2$ entries are manually removed from Pymatgen and the calculated $O_2$ and $H_2$ chemical potentials indicative of ORR operating conditions are substituted. More information on how these chemical potentials were calculated is given in the Supplementary Details, below.

Chemical Potentials Used in Phase Stability Analysis Open to $O_2$ and $H_2$

The values of the chemical potentials for $O_2$ and $H_2$ used in the phase diagram analysis tools in Pymatgen were derived from standard gas phase thermodynamics equations. As all solid phase DFT energies are under conditions of T=0 K and P=0 atm, the temperature and pressure values typical of ORR operating conditions are built into the $O_2$ and $H_2$ gas chemical potentials. The chemical potential of $O_2$ was calculated using experimental data from the NIST chemistry webbooks[61] and standard thermochemistry equations as detailed in other works.[32, 54, 62-64] From these calculations, an O chemical potential of 6.25 eV/O at T=1073 K and $P_{O_2}$=0.21 atm was obtained. The H chemical potential was calculated using the value of the O chemical potential and equilibrium with water vapor. As with the case of $O_2$ gas, the NIST chemistry webbook was used to obtain experimental data of the free energy of $H_2O$. A typical humid environment with relative humidity of 100% was assumed. Using these values, an H chemical potential of −3.71 eV/H was obtained.

Example 2

In this Example, a cathode including a perovskite compound of Table 2, above, ($BaFe_{0.125}Co_{0.125}Zr_{0.75}O_3$) was made and tested in a solid oxide fuel cell.

First, an infiltration solution was prepared according to Table 3, below. Each of the salts was dissolved in a mixture of water and citric acid in the amounts indicated in the table.

TABLE 3

Infiltration Solution for $BaFe_{0.125}Co_{0.125}Zr_{0.75}O_3$ (BFCZ). The total volume of solution prepared was 50 ml at a concentration of 0.25M.

| Chemical | M.W. (g/mol) | Composition | Mole | Weight (g) |
| --- | --- | --- | --- | --- |
| $Ba(NO_3)_2$ | 261.37 | 1 | 0.0125 | 3.267 |
| $Fe(NO_3)_3 \cdot 9H_2O$ | 404 | 0.125 | 0.0015625 | 0.631 |
| $Co(NO_3)_2 \cdot 6H_2O$ | 291.04 | 0.125 | 0.0015625 | 0.455 |
| $Zr(NO_3)_2 \cdot nH_2O$ | 263.25 | 0.75 | 0.009375 | 2.468 |
| Citric acid | 192.13 | 0.2 | 0.0025 | 0.480 |

Next, an automated sonic spray coating system was used to spray the infiltration solution onto a cathode substrate to provide an infiltrated cathode including the perovskite compound. The spray coating system used is the ExactaCoat Programmable Coater from Sono Tek Corporation, with a 120 kHz ultrasonic spraying nozzle. The cathode substrate was $La_{0.6}Sr_{0.4}Co_{0.2}Fe_{0.8}O_3$ (LSCF)/$Sm_{0.15}Ce_{0.85}O_2$ (SDC). This cathode is commercially available from MSRI Co. (Salt Lake City, Utah). The cathode is composed of a 10 µm-thick $La_{0.6}Sr_{0.4}Co_{0.2}Fe_{0.8}O_3$/$Sm_{0.15}Ce_{0.85}O_2$ functional layer and a 40 µm-thick LSCF current collecting layer. The functional layer has typical grain sizes of 0.5-1 µm and a porosity of approximately 35%. The infiltrated cathode was subjected to calcination at 850° C. for 1 hour.

X-ray powder diffraction (XRD) results confirmed that the perovskite formed was $BaFe_{0.125}Co_{0.125}Zr_{0.75}O_3$.

Figure 6:
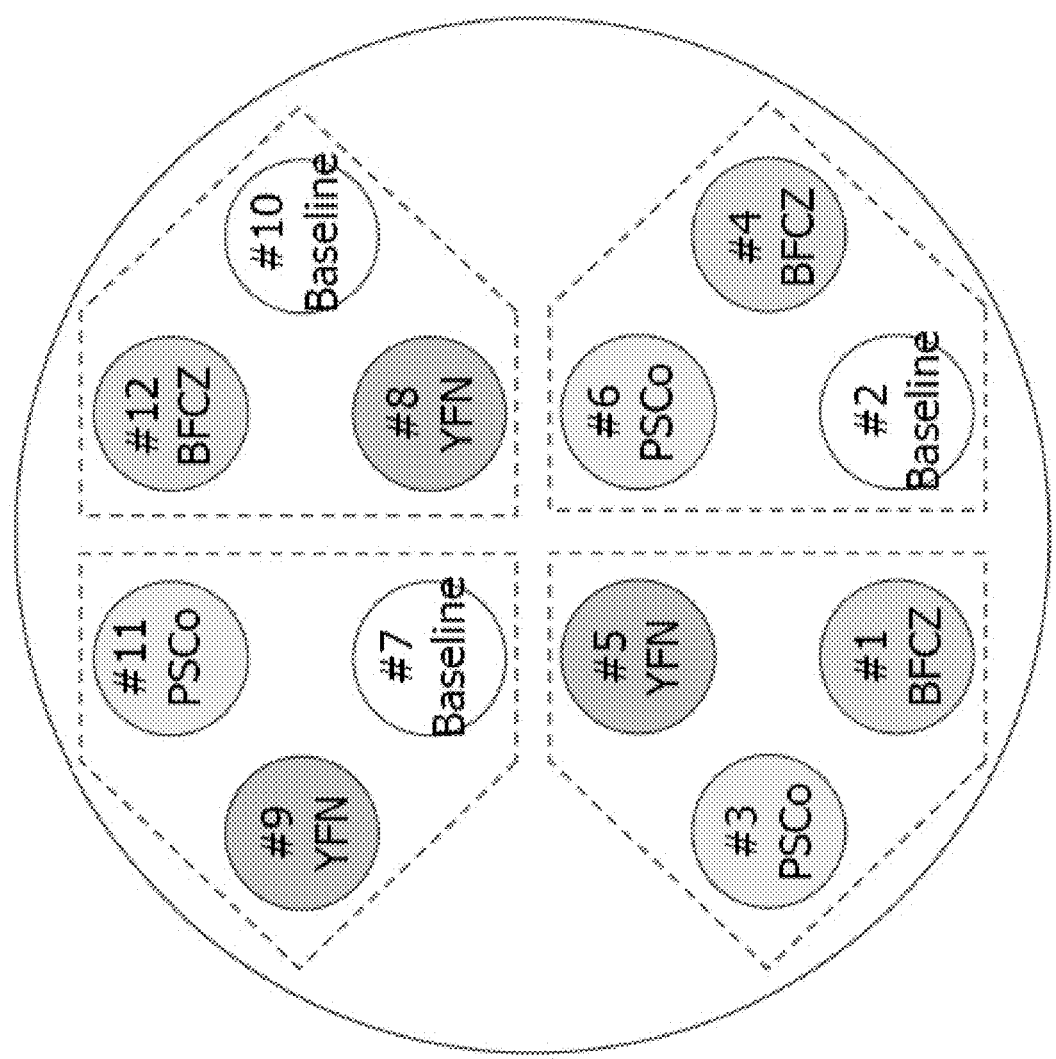
FIG. 6 is a schematic of the top view of the Multi Cell Array (MCA) used to test illustrative perovskite compounds according to the present disclosure.

For testing, the infiltrated cathode was loaded into a Multi Cell Array (MCA) (schematically illustrated in FIG. 6). The baseline cells shown in FIG. 6 included a cathode composed of $La_{0.6}Sr_{0.4}Co_{0.2}Fe_{0.8}O_3$/$Sm_{0.15}Ce_{0.85}O_2$; an anode composed of Ni/$Y_2O_3$-stabilized $ZrO_2$; and $Y_2O_3$-stabilized $ZrO_2$ as the electrolyte. The same anode and electrolyte was used for all tests. PSCo is a comparative cell infiltrated with $Pr_{1-x}Sr_xCoO_3$ (exact composition is $Pr_{0.6}Sr_{0.4}CoO_{3-d}$) with same anode and electrolyte as above. This is an infiltrated cell that offers improved performance compared to the baseline of an un-infiltrated LSCF cell. The operating conditions of the MCA were those appropriate for driving the ORR. The operation conditions were as follows: the operation temperature was 750° C.; air was introduced to common cathode compartment at a flow rate of 2 L/min; hydrogen gas was introduced to each anode at a flow rate of 0.3 L/min; a constant current operation was used of 0.25 A/cm$^2$; and the operation time was 385 h. Impedance spectra measurements were taken at 0, 24, 120, 192, 288, and 384 hours.

Figure 7:
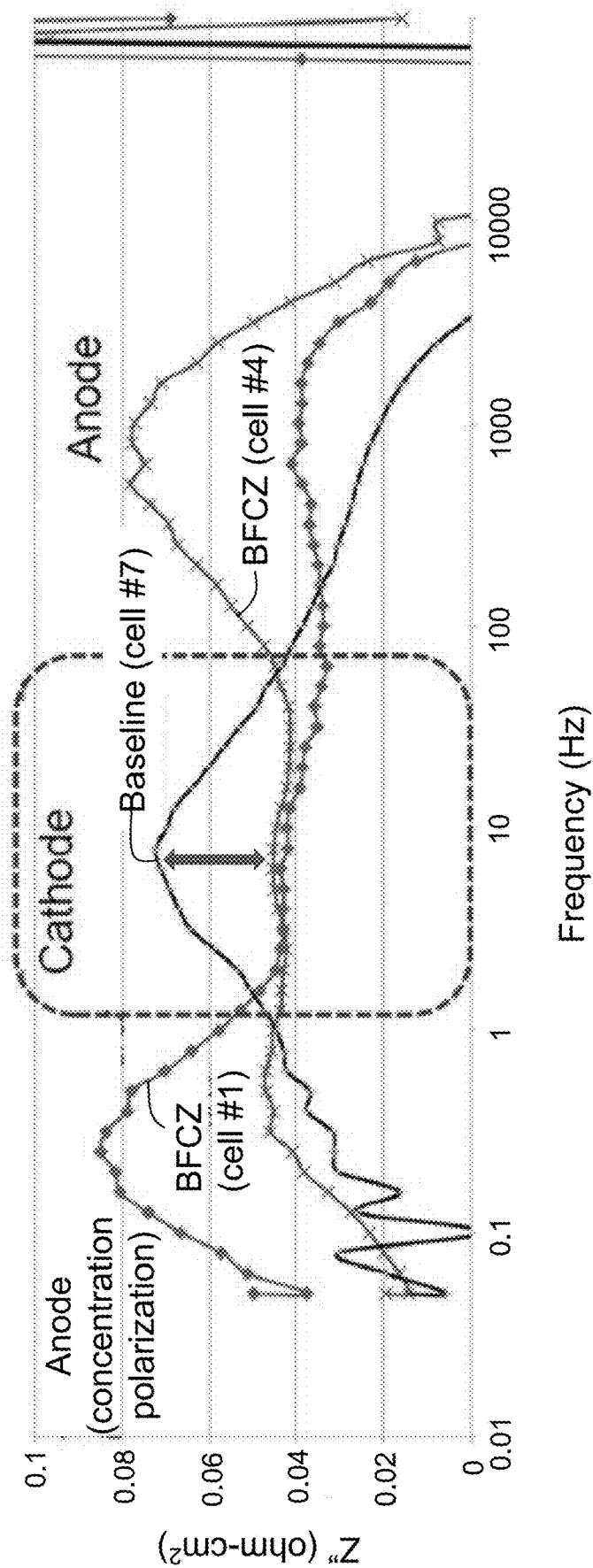
FIG. 7 is an experimental impedance plot taken at 120 hours of one cell of the MCA of FIG. 6 containing the perovskite compound $BaFe_{0.125}Co_{0.125}Zr_{0.75}O_3$.

FIG. 7 shows an impedance plot of the BFCZ cell taken at 120 hours after current application. The cathode region is indicated with a dotted line. Impedance spectra were fitted using an equivalent circuit model consisting of $R_o$, L, and three RQ elements. The resistance change from 0.096 to 0.068 ohm·cm$^2$ as compared to the baseline cell is marked with an arrow. This shows that the BFCZ material gives approximately a 40% reduced resistance as compared to a state-of-the art commercial SOFC cathode. This corresponds to approximately a 30% reduction in cathode losses and a 20% reduction in fuel cell losses. This should enable lower temperature operation and associated increased durability for the fuel cell.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

REFERENCES

1. N. S. Lewis and D. G. Nocera, *Proc. Nat. Acad. Sci.,* 2006, 103, 15729-15735.
2. J. A. Turner, *Science,* 1999, 285, 687-689.
3. W. Kreuter and H. Hofmann, *Int. J. Hyd. Energ.,* 1998, 23, 661-666.
4. S. C. S. a. K. Kendall, High-temperature Solid Oxide Fuel Cells: Fundamentals, Design and Applications, Elsevier Science, 2004.
5. A. Chroneos, B. Yildiz, A. Tarancon, D. Parfitt and J. A. Kilner, *Energ. Environ. Sci.,* 2011, 4, 2774-2789.
6. J. Suntivich, H. A. Gasteiger, N. Yabuuchi, H. Nakanishi, J. B. Goodenough and Y. Shao-Horn, *Nat. Chem.,* 2011, 3, 546-550.
7. W. T. Hong, M. Risch, K. A. Stoerzinger, A. Grimaud, J. Suntivich and Y. Shao-Horn, *Energ. Environ. Sci.,* 2015.
8. S. M. Haile, *Acta Materialia,* 2003, 51, 5981-6000.
9. A. J. Jacobson, *Chem Mater,* 2010, 22, 660-674.
10. S. J. Skinner, *Int. J. Inorg. Mat.,* 2001, 3, 113-121.
11. S. Švarcová, K. Wiik, J. Tolchard, H. J. M. Bouwmeester and T. Grande, *Sol. State Ion.,* 2008, 178, 1787-1791.
12. M. Arnold, T. M. Gesing, J. Martynczuk and A. Feldhoff, *Chem Mater,* 2008, 20, 5851-5858.
13. A. Grimaud, K. J. May, C. E. Carlton, Y.-L. Lee, M. Risch, W. T. Hong, J. Zhou and Y. Shao-Horn, *Nat. Comm.,* 2013, 4.
14. Y.-L. Lee, J. Kleis, J. Rossmeisl, Y. Shao-Horn and D. Morgan, *Energ. Environ. Sci.,* 2011, 4, 3966-3970.
15. A. V. Berenov, A. Atkinson, J. A. Kilner, E. Bucher and W. Sitte, *Solid State Ionics,* 2010, 181, 819-826.
16. J. Mizusaki, Y. Mima, S. Yamauchi, K. Fueki and H. Tagawa, *Journal of Solid State Chemistry,* 1989, 80, 102-111.
17. Y. L. Yang, C. L. Chen, S. Y. Chen, C. W. Chu and A. J. Jacobson, *Journal of The Electrochemical Society,* 2000, 147, 4001-4007.
18. J. Yoo, A. Verma, S. Wang and A. J. Jacobson, *J. Elecrochem. Soc.,* 2005, 152, A497-A505.
19. W. Jung and H. L. Tuner, *Adv. Energ. Mat.,* 2011, 1, 1184-1191.
20. F. Dong, D. Chen, Y. Chen, Q. Zhao and Z. Shao, *J. Mat. Chem.,* 2012, 22, 15071-15079.
21. F. Dong, Y. Chen, R. Ran, D. Chen, M. O. Tade, S. Liu and Z. Shao, *J. Mat. Chem. A,* 2013, 1, 9781-9791.
22. H. Zhang, A. Suresh, C. B. Carter and B. A. Wilhite, *Sol. State Ion.,* 2014, 266, 58-67.
23. D. Y. Kim, S. Miyoshi, T. Tsuchiya and S. Yamaguchi, *ECS Trans.,* 2012, 45, 161-170.
24. I. M. Hung, C.-J. Ciou, Y.-J. Zeng, J.-S. Wu, Y.-C. Lee, A. Su and S.-H. Chan, *J. Eur. Cer. Soc.,* 2011, 31, 3095-3101.

25. F. Dong, Y. Chen, D. Chen and Z. Shao, *Appl. Mat. Int.*, 2014, 6, 11180-11189.
26. C. Zhu, X. Liu, C. Yi, L. Pei, D. Yan, J. Niu, D. Wang and W. Su, *Electrochem. Comm.*, 2009, 11, 958-961.
27. J. Maier, *Sol. State Ion.*, 1998, 112, 197-228.
28. J. E. ten Elshof, M. H. R. Lankhorst and H. J. M. Bouwmeester, *Solid State Ionics*, 1997, 99, 15-22.
29. MAST Development Team, University of Wisconsin-Madison Computational Materials Group. MAST documentation, https://pypi.python.org/pypi/MAST/1.1.4).
30. T. Angsten, T. Mayeshiba, H. Wu and D. Morgan, *New Journal of Physics*, 2014, 16, 015018.
31. S. P. Ong, W. D. Richards, A. Jain, G. Hautier, M. Kocher, S. Cholia, D. Gunter, V. L. Chevrier, K. A. Persson and G. Ceder, *Comp Mater Sci*, 2013, 68, 314-319.
32. Y.-L. Lee, J. Kleis, J. Rossmeisl and D. Morgan, *Phys Rev B*, 2009, 80, 224101-224101-224120.
33. J. Suntivich, K. J. May, H. A. Gasteiger, J. B. Goodenough and Y. Shao-Horn, *Science*, 2011, 334, 1383-1385.
34. J. Luo, Z.-J. Qiu, J. Deng, C. Zhao, J. Li, W. Wang, D. Chen, D. Wu, M. Östling, T. Ye and S.-L. Zhang, *Microelec. Eng.*, 2013, DOI: http://dx.doi.org/10.1016/j.mee.2013.09.003.
35. T. Susaki, A. Makishima and H. Hosono, *Phys Rev B*, 2011, 84, 115456.
36. P. Zubko, S. Gariglio, M. Gabay, P. Ghosez and J.-M. Triscone, *Ann. Rev. Conden. Matt. Phys.*, 2011, 2, 141-165.
37. A. M. Kolpak and S. Ismail-Beigi, *Phys Rev B*, 2012, 85, 195318.
38. K. F. Garrity, A. M. Kolpak and S. Ismail-Beigi, *J Mater Sci*, 2012, 47, 7417-7438.
39. X. W. Li, A. Gupta, G. Xiao and G. Q. Gong, *Appl. Phys. Lett.*, 1997, 71, 1124-1126.
40. J. Teresa, A. Barthelemy, A. Fert, J. Contour, F. Montaigne and P. Seneor, *Science*, 1999, 286.
41. M. Mrovec, J. M. Albina, B. Meyer and C. Elsässer, *Phys Rev B*, 2009, 79, 245121.
42. N. Horiuchi, T. Hoshina, H. Takeda and T. Tsurumi, *J. Cer. Soc. Japan*, 2010, 118, 664-668.
43. G. Kresse and J. Furthmuller, *Phys Rev B*, 1996, 54, 11169-11186.
44. J. P. Perdew, K. Burke and M. Ernzerhof, *Phys. Rev. Lett.*, 1996, 77, 3865-3868.
45. G. Kresse and D. Joubert, *Phys Rev B*, 1999, 59, 1758-1775.
46. S. Ping Ong, A. Jain, G. Hautier and C. Moore, Materials Project documentation, https://materialsproject.org/docs/calculations).
47. J. Hubbard, Proceedings of the Royal Society of London. Series A, Mathematical and Physical Sciences, 1963, 276, 238-257.
48. A. Jain, S. P. Ong, G. Hautier, W. Chen, W. D. Richards, S. Dacek, S. Cholia, D. Gunter, D. Skinner, G. Ceder and K. A. Persson, *APL Mat.*, 2013, 1, 011002.
49. H. J. Monkhorst and J. D. Pack, *Phys Rev B*, 1976, 13, 5188-5192.
50. W. T. Hong, K. A. Stoerzinger, B. Moritz, T. P. Devereaux, W. Yang and Y. Shao-Horn, *J Phys Chem C*, 2015, 119, 2063-2072.
51. J. Suntivich, W. T. Hong, Y.-L. Lee, J. M. Rondinelli, W. Yang, J. B. Goodenough, B. Dabrowski, J. W. Freeland and Y. Shao-Horn, *J Phys Chem C*, 2014, 118, 1856-1863.
52. E. Bucher, W. Sitte, F. Klauser and E. Bertel, *Sol. State Ion.*, 2011, 191, 61-67.
53. E. Bucher, W. Sitte, F. Klauser and E. Bertel, *Sol. State Ion.*, 2012, 208, 43-51.
54. L. Wang, T. Maxisch and G. Ceder, *Phys Rev B*, 2006, 73, 195107.
55. A. Jain, G. Hautier, S. P. Ong, C. J. Moore, C. C. Fischer, K. A. Persson and G. Ceder, *Phys Rev B*, 2011, 84, 045115.
56. D.-Y. Kim, S. Miyoshi, T. Tsuchiya and S. Yamaguchi, *Chem Mater*, 2013, 26, 927-934.
57. T. Matsui, E. Taketani, N. Fujimura, H. Tsuda and K. Morii, *J. Appl. Phys.*, 2005, 97,
58. Y. Wu, P. Lazic, G. Hautier, K. Persson and G. Ceder, *Energ. Environ. Sci.*, 2013, 6, 157-168.
59. J. E. Saal, S. Kirklin, M. Aykol, B. Meredig and C. Wolverton, *JOM*, 2013, 65, 1501-1509.
60. V. L. Chevrier, S. P. Ong, R. Armiento, M. K. Y. Chan and G. Ceder, *Phys Rev B*, 2010, 82, 075122.
61. NIST Standard Reference Database No. 69, edited by P. J. Linstrom and W. G. Mallard (National Institute of Standards and Technology, Gaithersburg, Md., 2003), http://webbook.nist.gov/chemistry/).
62. R. M. Jacobs, J. H. Booske and D. Morgan, *Phys Rev B*, 2012, 86, 054106-054101-054110.
63. V. Vlahos, J. H. Booske and D. Morgan, *Phys Rev B*, 2010, 81, 054207-054201-054215.
64. K. A. Persson, B. Waldwick, P. Lazic and G. Ceder, *Phys Rev B*, 2012, 85, 235438.

What is claimed is:

1. A solid oxide fuel cell (SOFC) comprising a cathode, an anode, and a solid oxide electrolyte between the anode and the cathode, wherein the cathode comprises a perovskite compound, wherein the perovskite compound is selected from $A_{(1-x)}A'_xB_yB'_{y'}B''_{y''}O_3$ (Formula 1C), wherein $0 \le x \le 0.5$, $0.125 \le y \le 1$, $0 \le y' \le 0.875$, $0 \le y'' \le 0.875$, $y+y'+y''=1$, and if x is zero, then y is not 1; wherein A is selected from Ba and Y; A' is selected from Ca, Sr, Ba, Sm, Nd, Cd, and Sn, wherein A and A' are different; B is selected from Cr, Mn, Fe, and Co; B' is selected from Co, Ni, Zr, Nb, Ru, Hf, Ta, Re, Os, and Pt; and B'' is Zr, wherein B, B', and B'' are different; and combinations thereof;

wherein the perovskite compound is characterized by a log k* value which is less negative than about −6.0 cm/s; an energy above the convex hull of less than about 40 meV/(formula unit); a bandgap of about 0 and a charge transfer gap of about 0, and further wherein the perovskite compound is not $Ba_{0.5}Sr_{0.5}Fe_{0.9}Nb_{0.1}O_3$ and is not $BaCo_{0.4}Fe_{0.4}Zr_{0.2}O_3$.

2. The SOFC of claim 1, wherein A is Y; or A' is Cd or Sn; or B' is selected from Ru, Hf, Ta, Re, and Os; or all three.

3. The SOFC of claim 1, wherein the perovskite compound is selected from $A_{(1-x)}A'_xB_{(1-y)}B'_yO_3$ (Formula 2A), wherein $0 \le x \le 0.5$, $0 \le y \le 0.875$, and x and y are not both zero;

wherein A is selected from Ba and Y; A' is selected from Ca, Sr, Ba, Sm, Nd, and Sn, wherein A and A' are different; B is selected from Cr, Mn, Fe, and Co; and B' is selected from Ni, Zr, Nb, Ru, Ta, Re, Os, and Pt.

4. The SOFC of claim 3, wherein A is Y; or A' is Sn; or B' is selected from Ru, Ta, Re, and Os; or all three.

5. The SOFC of claim 1, wherein the perovskite compound is selected from $AB_yB'_{y'}B''_{y''}O_3$ (Formula 3A), wherein $0.125 \le y \le 0.875$; $0.125 \le y' \le 0.875$; and $0 \le y'' \le 0.875$; wherein A is selected from Ba and Y; B is Fe; B' is selected from Co, Ni, Nb, Ru, Ta, Re, Os and Pt; and B'' is Zr.

6. The SOFC of claim 5, wherein A is Ba; B is Fe; B' is selected from Co, Nb, Ru, Ta, Re, Os and Pt; and B'' is Zr.

7. The SOFC of claim 6, wherein B' is selected from Ru, Ta, Re, and Os.

8. The SOFC of claim 5, wherein the perovskite compound is selected from $AB_{(1-y)}B'_yO_3$ (Formula 3B), wherein $0.125 \leq y \leq 0.875$; wherein A is selected from Ba and Y; B is Fe; and B' is selected from Ni, Nb, Ru, Ta, Re, Os, and Pt.

9. The SOFC of claim 8, wherein A is Ba; B is Fe; and B' is selected from Nb, Ru, Ta, Re, Os, and Pt.

10. The SOFC of claim 9, wherein B' is selected from Ru, Ta, Re, and Os.

11. The SOFC of claim 1, wherein the perovskite compound is selected from $A_{(1-x)}A'_xB_yB'_{y'}B''_{y''}O_3$ (Formula 4A), wherein $0 \leq x \leq 0.5$; $0.125 \leq y \leq 0.875$; $0.125 \leq y' \leq 0.875$; and $0 \leq y'' \leq 0.75$;

wherein A is Ba; A' is selected from Cd, and Sn; B is Fe; B' or B" or both is selected from an element having an oxidation state which does not change under the operating conditions for driving the oxygen reduction reaction; and B" is Zr, wherein B, B' B" are different.

12. The SOFC of claim 11 wherein B' is selected from Co, Zr, Nb, Hf, Ta, and Re.

13. The SOFC of claim 11, wherein the perovskite compound is selected from $A_{(1-x)}A'_xB_yB'_{y'}B''_{y''}O_3$ (Formula 4B), wherein $0.125 \leq x \leq 0.25$; $y=y'=0.125$; and $y''=0.75$; wherein A is Ba; A' is selected from Cd and Sn; B is Fe; B' is Hf; and B" is Zr.

14. A solid oxide fuel cell (SOFC) comprising a cathode, an anode, and a solid oxide electrolyte between the anode and the cathode, wherein the cathode comprises a perovskite compound, wherein the perovskite compound is characterized by a log k* value which is less negative than about −6.0 cm/s; an energy above the convex hull of less than about 40 meV/(formula unit); a bandgap of about 0 and a charge transfer gap of about 0, wherein the perovskite compound is selected from $A_{(1-x)}A'_xB_yB'_{y'}B''_{y''}O_3$ (Formula 5), wherein $0 \leq x \leq 0.25$; $0.125 \leq y \leq 0.875$; $0.125 \leq y' \leq 0.875$; and $0 \leq y'' \leq 0.75$;

wherein A is Ba; A' is Sn; B is Fe; B' is selected from Co, Zr, Nb, Ru, Hf, Ta, Re, and Pt; and B" is Zr, wherein B' and B" are different; and further wherein the perovskite compound is not $BaCo_{0.4}Fe_{0.4}Zr_{0.2}O_3$.

15. The SOFC of claim 14, wherein B' is selected from Hf, Ta, and Re.

16. A solid oxide fuel cell (SOFC) comprising a cathode, an anode, and a solid oxide electrolyte between the anode and the cathode, wherein the cathode comprises a perovskite compound, wherein the perovskite compound is characterized by a log k* value which is less negative than about −6.0 cm/s; an energy above the convex hull of less than about 40 meV/(formula unit); a bandgap of about 0 and a charge transfer gap of about 0, and further wherein the perovskite compound is selected from $BaFe_{0.75}Nb_{0.25}O_3$; $BaFe_{0.75}Ta_{0.25}O_3$; $BaFe_{0.125}Co_{0.125}Zr_{0.75}O_3$; $BaFe_{0.875}Re_{0.125}O_3$; $Ba_{0.625}La_{0.125}Zn_{0.375}NiO_3$; $Ba_{0.875}Sn_{0.125}Fe_{0.125}Zr_{0.875}O_3$; $BaFe_{0.75}Ru_{0.25}O_3$; $BaFe_{0.5}Pt_{0.5}O_3$; $Ba_{0.75}Sn_{0.25}Fe_{0.125}Hf_{0.125}Zr_{0.75}O_3$; $YFe_{0.875}Ni_{0.125}O_3$; $Ba_{0.875}Cd_{0.125}Fe_{0.125}Hf_{0.125}Zr_{0.75}O_3$; $BaFe_{0.5}Ru_{0.5}O_3$; $BaFe_{0.75}Os_{0.25}O_3$; $Ba_{0.75}Cd_{0.25}Fe_{0.125}Hf_{0.125}Zr_{0.75}O_3$; $YFe_{0.875}Co_{0.125}O_3$; and combinations thereof.

17. An electrode comprising a perovskite compound selected from $BaFe_{0.75}Nb_{0.25}O_3$; $BaFe_{0.75}Ta_{0.25}O_3$; $BaFe_{0.125}Co_{0.125}Zr_{0.75}O_3$; $BaFe_{0.875}Re_{0.125}O_3$; $Ba_{0.625}La_{0.125}Zn_{0.375}NiO_3$; $Ba_{0.875}Sn_{0.125}Fe_{0.125}Zr_{0.875}O_3$; $BaFe_{0.75}Ru_{0.25}O_3$; $BaFe_{0.5}Pt_{0.5}O_3$; $Ba_{0.75}Sn_{0.25}Fe_{0.125}Hf_{0.125}Zr_{0.75}O_3$; $YFe_{0.875}Ni_{0.125}O_3$; $Ba_{0.875}Cd_{0.125}Fe_{0.125}Hf_{0.125}Zr_{0.75}O_3$; $BaFe_{0.5}Ru_{0.5}O_3$; $BaFe_{0.75}Os_{0.25}O_3$; $Ba_{0.75}Cd_{0.25}Fe_{0.125}Hf_{0.125}Zr_{0.75}O_3$; $YFe_{0.875}Co_{0.125}O_3$; and combinations thereof.

* * * * *

UNITED STATES PATENT AND TRADEMARK OFFICE
CERTIFICATE OF CORRECTION

PATENT NO. : 10,581,085 B2
APPLICATION NO. : 15/384482
DATED : March 3, 2020
INVENTOR(S) : Ryan Matthew Jacobs et al.

Page 1 of 1

It is certified that error appears in the above-identified patent and that said Letters Patent is hereby corrected as shown below:

In the Specification

Column 5, Line 22:
Delete the phrase "formula $A_{(1-x-y)}A'A''_yBO_3$ (Formula 1B)," and replace with
--formula $A_{(1-x-y)}A'_xA''_yBO_3$ (Formula 1B),--.

Column 13, Line 3:
Delete the phrase "along the direction." and replace with --along the [001] direction.--.

Column 17, Lines 50-52:
Delete the phrase "$La_{0.625}Sr_{0.375}CO_{0.25}Fe_{0.75}O_3$ (LSCF) has a lower activity but better stability than a state-of-the-art material like $Ba_{0.5}Sr_{0.5}CO_{0.75}Fe_{0.25}O_3$ (BSCF)." and replace with
--$La_{0.625}Sr_{0.375}Co_{0.25}Fe_{0.75}O_3$ (LSCF) has a lower activity but better stability than a state-of-the-art material like $Ba_{0.5}Sr_{0.5}CO_{0.75}Fe_{0.25}O_3$ (BSCF).--.

Column 24, Line 55:
Delete the phrase "W. Jung and H. L. Tuner," and replace with --W. Jung and H. L. Tuller,--.

Signed and Sealed this
Second Day of June, 2020

Andrei Iancu
*Director of the United States Patent and Trademark Office*